United States Patent [19]

Shikama et al.

[11] Patent Number: 5,513,172
[45] Date of Patent: Apr. 30, 1996

[54] FRAME RELAY APPARATUS AND A RELAY METHOD

[75] Inventors: Toshihiro Shikama; Hiroyuki Sato, both of Kanagawa, Japan

[73] Assignee: Mitsubishi Denki Kabushiki Kaisha, Tokyo, Japan

[21] Appl. No.: 291,761

[22] Filed: Aug. 17, 1994

[30] Foreign Application Priority Data

Aug. 24, 1993 [JP] Japan ................................ 5-209638

[51] Int. Cl.$^6$ .................................................. H04J 3/24
[52] U.S. Cl. ............................ 370/13; 370/17; 370/61; 370/84; 370/94.2
[58] Field of Search ........................ 370/84, 58.1, 58.2, 370/58.3, 61, 91, 94.2, 60, 60.1, 17, 79, 82, 94.1, 13; 371/47.1

[56] References Cited

U.S. PATENT DOCUMENTS

| | | | |
|---|---|---|---|
| 4,206,322 | 6/1980 | Lurtz ............................... | 370/84 |
| 4,829,227 | 5/1989 | Turner ............................. | 370/60 |
| 4,890,280 | 12/1989 | Hirata ............................. | 370/60 |
| 5,020,052 | 5/1991 | DePycker et al. ................ | 370/61 |
| 5,144,297 | 9/1992 | Ohara .............................. | 370/84 |
| 5,237,564 | 8/1993 | Lespagnol et al. ............... | 370/60.1 |
| 5,260,936 | 11/1993 | Bardet et al. ................... | 370/61 |
| 5,319,638 | 6/1994 | Lin .................................. | 370/84 |

OTHER PUBLICATIONS

P. Kermani & L. Kleinrock "Virtual Cut-Through: A New Computer Communication Switching Technique" Computer Science Dept. UofCal, 1979.

Primary Examiner—Alpus H. Hsu
Assistant Examiner—Ricky Q. Ngo
Attorney, Agent, or Firm—Wolf, Greenfield & Sacks

[57] ABSTRACT

This invention provides a frame relay apparatus and a relay method with an efficient transfer time, regardless of the transmitting rates of the input signal and the output signal. A route control table which corresponds the transmitting line number to the transmitting logical link number by using the receiving line number and the received logical link number of the header of the received frame is provided as is a line attribute table which stores the transmitting rates of the input signal and output signal. Furthermore, the line attribute table to store the transmitting rates of the input signal and the output signal and a comparison control mechanism to calculate the necessary buffering amount of the sending buffer based on the frame length of the concerning received frame which is gotten at or before the receiving time of the data of the received frame are provided. Additionally, a transmitting handler mechanism is provided to start a transmission immediately when the transmission rate of the designated transmitting line is equal to or lower than the transmitting rate of the input signal, and to start a transmission after storing the transmission data up to the required buffering amount when the transmitting rate of the input signal is higher than the transmitting rate of the output signal.

21 Claims, 33 Drawing Sheets

FIG. 3(a)

| | | | |
|---|---|---|---|
| REC. LINE No. | REC. LOG. LINK No. | XMIT. LINE No. | XMIT. LOG. LINK. No. |
| 41 | 42 | 43 | 44 |

| | |
|---|---|
| LINE No. | RATE |
| 45 | 46 |

| REC. LINE No. | REC. LOG. LINK No. | XMIT LINE No. | XMIT. LOG. LINK N |
|---|---|---|---|
| ⋮ | ⋮ | ⋮ | ⋮ |
| L 1 | 1 | L 5 | 1 |
| L 1 | 2 | L 6 | 1 |
| L 2 | 1 | L 5 | 2 |
| L 2 | 2 | L 5 | 3 |
| L 2 | 3 | L 6 | 2 |
| ⋮ | ⋮ | ⋮ | ⋮ |

| LINE No. | RATE |
|---|---|
| ⋮ | ⋮ |
| L 1 | R 1 |
| L 2 | R 2 |
| ⋮ | ⋮ |
| L 5 | R 5 |
| L 6 | R 6 |
| ⋮ | ⋮ |

45  46

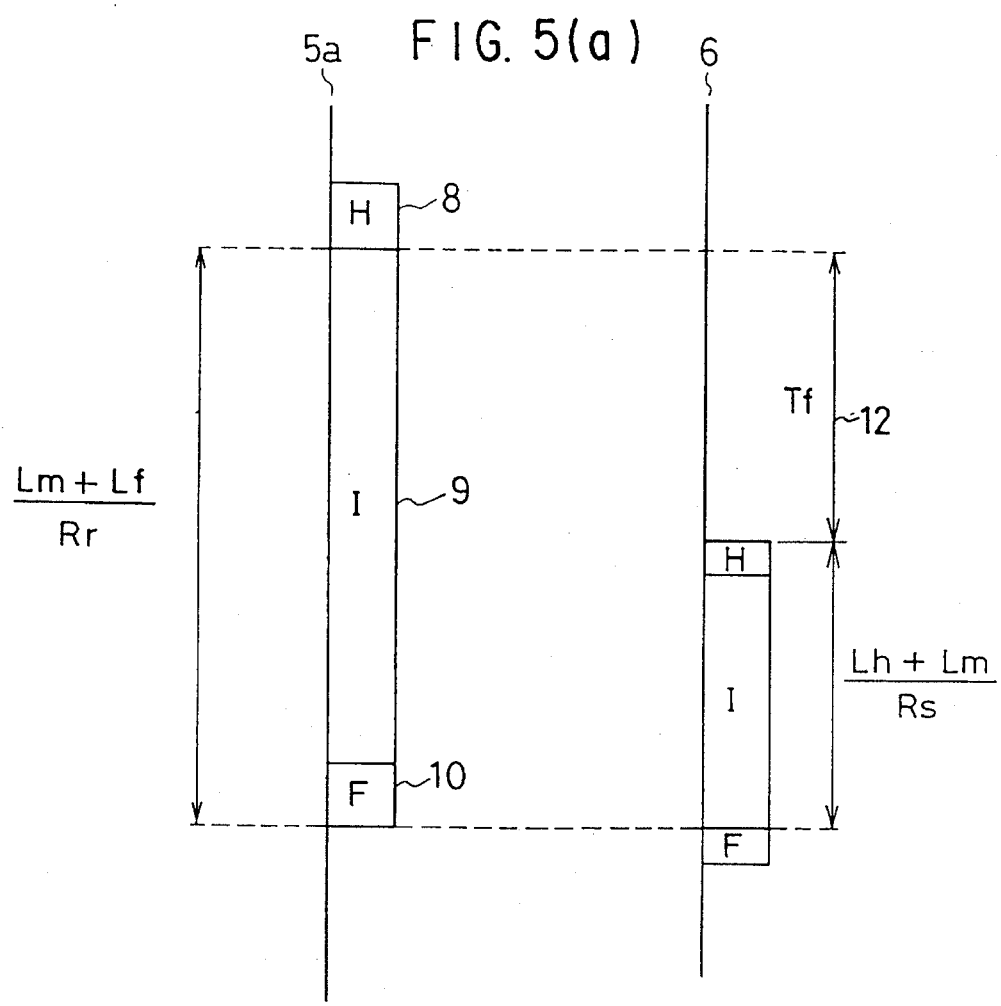

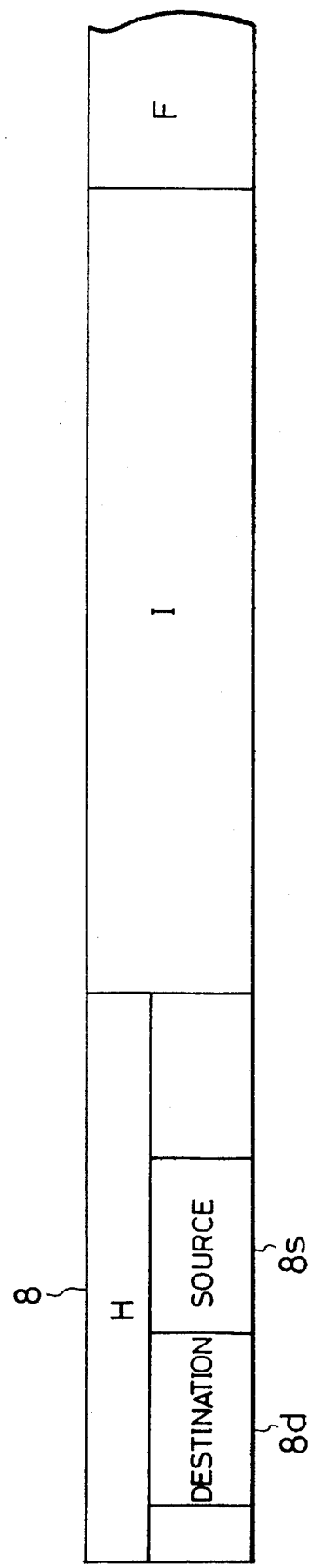

| REC. LINE No. | REC. LOG. LINK No. | XMIT LINE No. | XMIT. LOG. LINK No. | MAX. FR LENGTH | NEXT BUF. AMT |
|---|---|---|---|---|---|
| 41 | 42 | 43 | 44 | 47 | 49 |

| 8 | 7 | 6 | 5 | 4 | 3 | 2 | 1 |
|---|---|---|---|---|---|---|---|
| (UPPER DLCI) | | | | | | C/R | EA 0 |
| (LOWER DLCI) | | | | FECN | BECN | DE | EA 1 |

DEFAULT ADDRESS FIELD FORMAT (2 OCTET)

EA = EXPANTION BIT FOR ADDRESS FIELD

C/R = COMMAND / RESPONSE BIT

FECN = FORWORD EXPLICIT CONGESTION NOTICE

BECN = BACKWORD EXPLICIT CONGESTION NOTICE

DLCI = DATA LINK CONNECTION ID

DE = DISCARD ENABLE

F I G. 24

| 31 | | | | | |
|---|---|---|---|---|---|
| REC. LINE No. | REC. LOG. LINK No. | FR OUTSIDE | XMIT. LINE No. | XMIT. LOG. LINK No. | MAX. FR. LENGTH |
| 41 | 42 | 48 | 43 | 44 | 47 |

FIG. 28

| REC. LINE No. | REC. LOG. LINK No. | FR OUTSIDE | XMIT. LINE. No. | XMIT. LOG. LINK No. | MAX. FR. LENGTH | FR OUTSIDE |
|---|---|---|---|---|---|---|
| 41 | 42 | 48 | 43 | 44 | 47 | 48 |

31

FRAME RELAY APPARATUS AND A RELAY METHOD

BACKGROUND OF THE INVENTION

1. Field of the Invention

This invention relates to a frame relay apparatus (or frame handler) and a frame relay method to relay information in a communication network in a unit of a frame efficiently in time.

2. Description of the Related Art

"A Semi Store-and-Forward Packet Switching Method" in Published Unexamined Japanese Patent Application Sho 63-224443 and "A Frame Check Sequence Method" in Published Unexamined Japanese Patent Application Sho 62-57345 describe a semi store-and-forward switching technic of a packet or a frame. The packet used in ISDN (Integrated Services Digital Network), as described in the former application, and the frame used in the frame relay method, as described in the latter application, differ both in form and in the layers at which they are handled. However, the packet and the frame are the same in the sense that they treat a group of data as a unit for communication purposes. Therefore, hereinafter the word "frame" is used instead of the word "packet", even though "packet" is originally used in the published unexamined patent application.

FIG. 32 shows a configuration of a conventional semi store-and-forward switching method, employed in order to shorten a total communication time. In FIG. 32, terminals 1a and 1b, frame relay apparatuses (FR apparatuses, hereinafter) 2a and 2b, access lines 3a and 3b and a relay line 4 are shown. The terminal 1a is connected to the FR apparatus 2a through the access line 3a, and tile terminal 1b is connected to the FR apparatus 2b through the access line 3b. The FR apparatus 2a and the FR apparatus 2b are connected to each other via the relay line 4.

FIG. 33 shows a sample time sequence of a frame transfer in the configuration shown in FIG. 32. In FIG. 33, time is shown on the ordinate. The time sequence of the frame transmitted via the access line 3a, the relay line 4 and the access line 3b is shown respectively in the time sequence 5a, 6 and 5b. A frame 7, a header 8, information 9 and a frame check sequence 10 are also shown. Time t1, t2, t3 and t4 are used later in the explanation. In FIG. 33, the access line 3a and 3b and the relay line 4 are assumed to have the same transmission rate.

At first, a composition of a frame is explained. The frame 7 consists of the header 8, the information 9 and the frame check sequence 10. In the frame relay method, the header 8 includes a logical link number.

In each FR apparatus, a logical link number is provided in advance and is used in the two communicating terminals and in the route connecting the terminals. The logical link number is an independent number in each access line and relay line in the route which connects the terminals. Therefore, the FR apparatus keeps information on which communication line and which logical link number should be used to transmit the Frame 7 when the frame 7 is received via a certain communication line with a certain logical link number. Such information is kept in a table, for example.

Practically, when the FR apparatus receives the frame 7, tile FR apparatus determines the transmitting line and renews the logical link number in the header 8 to a new logical link number for tile next transmitting line according to the received line and the logical link number in the header 8 by referring to the table, for example.

A relay operation is explained chronologically, as follows. In FIG. 33, the terminal 1a starts a transmission of the frame 7 at the time t1. When the whole header of the frame is transmitted, the FR apparatus 2a receives the whole header 8 of the frame 7 at the time t2. The relay line 4 on which the frame 7 is transmitted is decided according to the logical link number included in the header 8 and the logical link number of the header 8 is renewed to a number for the next transmitting line. When the relay line 4 is available for use, the FR apparatus 2a starts a transmission of the received frame 7 around time t2.

In the same way, when the whole header is transmitted at the time t3, the FR apparatus 2b decides the next transmitting line and renews the logical link number of the header 8. In this case, the next transmitting line is tile access line 3b for the terminal 1b. When the access line 3b is also available for use, the FR apparatus 2b starts a transmission of the received frame 7 around time t3. The terminal 1b receives the whole frame 7 at the time t4.

the prior methods, an exclusive error detection signal is provided for the header 8 of the frame 7. By placing the signal either Just before or after the header 8, the frame 7 is prevented from being sent to an unintended destination due to wrong header information, when only the header 8 is received.

As stated above, in the conventional semi store-and-forward switching method, a communication time is shortened. However, an operation is not considered for the case when the rate of the receiving line and the rate of the transmitting line are different.

FIG. 34 shows the time sequence when the transmission rates of the lines are different. In FIG. 34, an abort signal 11 and a time t21 are shown. It is assumed that the configuration is same as FIG. 32, but the transmission rate of the relay line 4 is twice the transmission rate of the access line 3a and 3b.

The operation is as follows. The FR apparatus 2a receives the whole header 8 of the frame 7 from the access line 3a at the time t2. Then, the next transmitting line is decided as the relay line 4 and the header 8 is renewed at once. When the relay line 4 is available for use, the header 8 in the frame 7 starts to be transmitted.

The FR apparatus 2a transmits the information 9 to the relay line 4 continuously after the transmission of the header 8. However, the transmission rate to the relay line 4 is twice that of the receiving rate from the access line 3a. Therefore, the receipt gets behind at the time t21, while the information 9 is transmitted. Consequently, the transmitting data to the relay line 4 runs short. This condition is called a transmission underrun hereinafter.

The FR apparatus 2a transmits the abort signal 11 to notify the receiver of the abortion of the transmission. Consequently, the transmission of the frame 7 is failed.

Since the conventional semi store-and-forward switching method is composed as above mentioned, a communication time is shortened when a frame is relayed between the transmission lines with same communication rates. However, the semi store-and-forward switching method is unable to be applied to a case where the transmission rate of the output signal is higher than the transmission rate of the input signal.

This invention relates to addressing this problem. This invention aims at inventing a frame relay apparatus and a frame relay method with an excellent communication time efficiency, regardless of the transmission rates of the receiving and transmitting lines.

SUMMARY OF THE INVENTION

Accordingly, it is an object of this invention to solve the above mentioned problems in the conventional semi store-and-forward switching method. It is another object of this invention to offer a frame relay apparatus and a frame relay method with an excellent communication time efficiency, regardless of the transmission rates of the receiving and transmitting lines.

A frame relay apparatus according to one aspect of the-invention, which is connected to input lines and output lines, comprises:

at least one receiver, receiving a frame on one of the input lines at a first transmission rate, the frame having a header, the receiver including mechanism for providing header information indicative of the header;

a controller, receiving the header information, including;

mechanism for selecting one of the output lines as a selected output line on which to transmit the frame;

mechanism for determining a second transmission rate of the output line; and mechanism for determining a buffering amount based on the first and the second transmission rates and on the header information; and at least one transmitter, including;

a buffer coupled to the receiver to receive the frame;

mechanism for storing a portion of the frame in the buffer according to the buffering amount; and mechanism for transmitting the contents of the buffer on the selected output line at the second transmission rate.

The frame relay apparatus of this invention further comprises a switching module coupling the at least one receiver to the at least one transmitter, the switching module being controlled by the controller.

The mechanism for determining a buffering amount determines no buffering, if the second transmission rate is not less than the first transmission rate.

The header information includes a frame length, indicative of the length of the frame, and the mechanism for determining a buffering amount utilizes the frame length to determine the buffering amount.

The controller includes an attribute table having stored therein the second transmission rate and the mechanism for determining a second transmission rate accesses the attribute table to determine the second transmission rate.

The frame relay apparatus further includes a control table and the frame received by the receiver includes a transmitting logical line number. The control table includes a maximum frame length corresponding to the transmitting logical line number and the mechanism for determining a buffer amount determines the buffering amount based on the first and second transmission rates and on the maximum frame length.

The frame includes a frame check sequence and the frame relay apparatus further comprises:

mechanism for checking the frame check sequence of the frame received by tile receiver and for producing an error signal if there is a frame check error; and mechanism for providing the error signal on the selected output line.

The frame relay apparatus of this invention further includes a receiving buffer in the at least one receiver to hold a frame, the receiving buffer discarding the frame in response to the frame check error detected by the mechanism for checking.

The frame relay apparatus of this invention Further comprises:

an underrun detector to detect if an underrun has occurred in the transmitter; and a re-transmission requester to cause the transmitter to retransmit the frame stored in the buffer in response to the underrun detector detecting an underrun.

The control table includes first range information indicating whether the frame is destined to be transmitted outside of predetermined range of frame relay apparatuses and the controller includes mechanism for accessing the control table to access said first range information. The mechanism for storing will store the entire frame if the frame is destined to be transmitted outside the predetermined range.

The control table includes a buffering amount stored therein and the mechanism for determining a buffering amount accesses the control table to determine the buffering amount. The transmitter includes mechanism for checking the buffer to determine if a portion has been unutilized and the transmitter includes mechanism for reducing the buffering amount stored in the control table in response thereto.

The transmitter further includes mechanism for detecting an underrun and for increasing the buffering amount stored in the control table in response thereto.

The frame relay apparatus of this invention further comprises:

a re-transmission count memory to count times of re-transmission in a predefined time;

mechanism for determining whether the re-transmission count memory has a count exceeding a first predetermined threshold value and whether the re-transmission count memory has a count below a second predetermined threshold value; and the mechanism for storing stores the entire frame, if the mechanism for determining determines that the count exceeds the first predetermined threshold and the mechanism for storing stores a portion of the frame according to the buffering amount, if the count is less than the second predetermined threshold value.

The control table includes information indicating the frame originated from outside a predetermined range of frame relay apparatuses, and the mechanism for determining a buffering amount determines the entire frame should be stored, if the information indicates the frame originated from outside the predetermined range.

A method for relaying a frame, received at a first rate, and on a transmission line at a second rate, the method comprises the steps of:

(a) receiving the frame from a transmission source, the frame having a header;

(b) determining the first rate and the second rate by referring to a reference table using information from the header;

(c) if the second rate is not greater than the first rate, transmitting the frame immediately;

(d) if the second rate is greater than the first rate, calculating a ratio of the first rate with respect to the second rate to determine a buffering amount in conjunction with a frame length of the frame;

(e) buffering the received frame in accordance with the buffering amount if step (d) determines the second rate is greater; and (f) transmitting the buffered frame, if step (d) determines the second rate is greater.

The method of this invention further comprises the steps of checking a frame check sequence of the received frame to determine if a frame check sequence error is present; and transmitting the frame check sequence error on the transmission line if a frame check sequence error is detected.

The method of this invention comprises a case where steps (c) and (f) occur after the step of checking.

The method of this invention further comprises the steps of detecting if a transmission underrun has occurred on the transmission lines, and transmitting an abort signal on the transmission line, if an underrun is detected.

The method of relaying a frame in a frame relay network comprises the steps of:

(a) receiving a frame at a reception rate;

(b) determining if a destination of the frame is outside the frame relay network;

(c) if step (b) determines that the frame is destined to outside of the frame relay network, buffering the entire frame and checking the frame for a frame check sequence error;

(d) checking if the received frame is from a source outside the frame relay network;

(e) if step (d) determines that the source is outside the frame relay network determining a frame length of the frame;

(f) calculating a buffering amount based upon the reception rate, a transmission rate, and the frame length;

(g) buffering an amount of the received frame in accordance with the buffering amount; and (h) transmitting the buffered frame data at the transmission rate.

The method of relaying a frame in a frame relay network comprises the steps of:

(a) receiving a frame at a reception rate;

(b) determining if a destination of the frame is outside the frame relay network;

(c) if step (b) determines that the frame is destined to outside of the frame relay network, buffering the entire frame and checking the frame for a frame check sequence error;

(d) calculating a buffering amount based upon the reception rate, a transmission rate, and the frame length;

(e) buffering an amount of the received frame in accordance with the buffering amount; and (f) transmitting the buffered frame data at the transmission rate.

The method of relaying a frame in a frame relay network comprises the steps of:

(a) receiving a frame at a reception rate;

(b) checking if the received frame is from a source outside the frame relay network;

(c) if step (b) determines that the source is outside the frame relay network determining a frame length of the frame;

(d) calculating a buffering amount based upon the reception rate, a transmission rate, and the frame length;

(e) buffering an amount of the received frame in accordance with the buffering amount; and (f) transmitting the buffered frame data at the transmission rate.

The method of relaying a frame in a frame relay network comprises the steps of:

(a) receiving a frame at a reception rate;

(b) calculating a buffering amount based upon the reception rate, a transmission rate, and the frame length;

(c) buffering an amount of the received frame in accordance with the buffering amount; and (d) transmitting the buffered frame data at the transmission rate.

BRIEF EXPLANATION OF THE DRAWINGS

In the drawing.

FIGS. 3 (a)–3 (b) show samples of the route control table and the line attribute table of the FIG. 2;

FIGS. 4 (a)–4 (b) show samples of the route control table and the line attribute table of the FIG. 3 (a)–3 (b);

FIGS. 5 (a)–5 (b) show a time sequence chart and a chart to show the route control table to explain the frame store time of embodiment 2;

FIGS. 6 (a)–6 (b) show a format of a frame and the route control table in embodiment 3;

FIG. 22 shows a format of the FR header;

FIG. 24 shows the route control table in embodiment 11;

FIG. 28 shows the line attribute table of embodiment 15;

DESCRIPTION OF THE PREFERRED EMBODIMENTS

Embodiment 1

The principal objective of this invention is to provide a frame relay apparatus or frame handler with less latency of relay, regardless of the transmission rates of the communication lines before and after the frame relay apparatus. A configuration and an operation of the frame relay apparatus with such a principal function are explained in embodiment 1.

Figure 1:
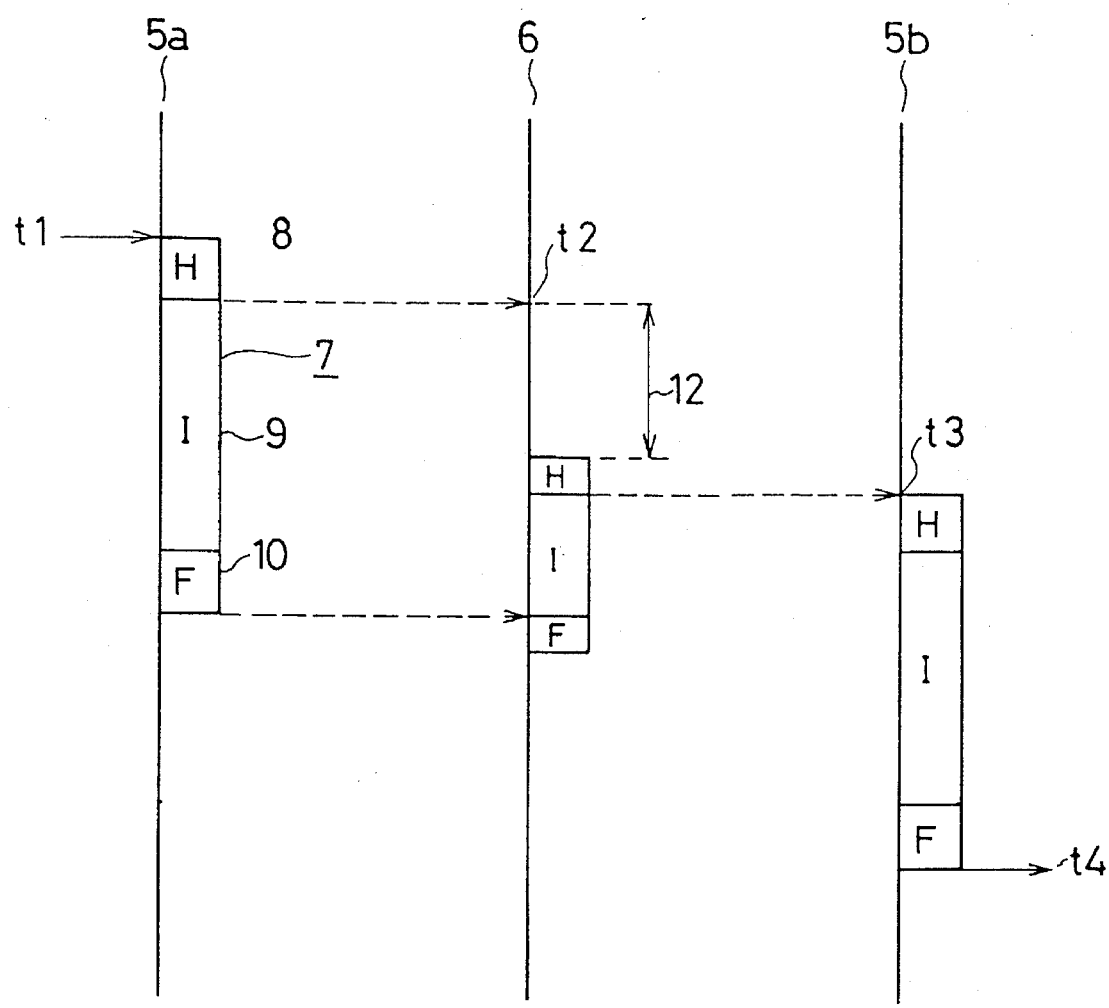
FIG. 1 shows a time sequence chart to explain an operation of a frame relay apparatus in an embodiment of this invention.

FIG. 1 shows an explanatory time sequence of a frame transfer of the frame relay apparatus of this embodiment.

Figure 32:
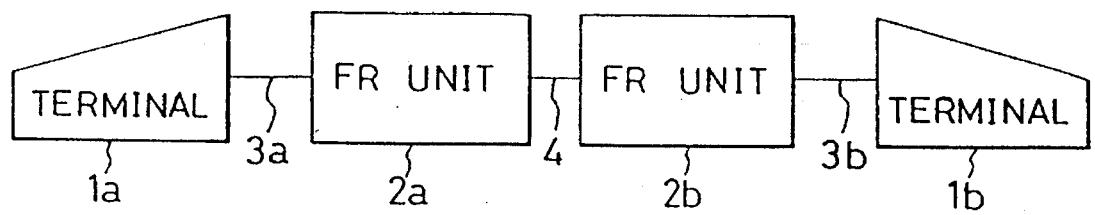
FIG. 32 shows a system configuration chart of a conventional semi store-and-forward switching method.
Figure 33:
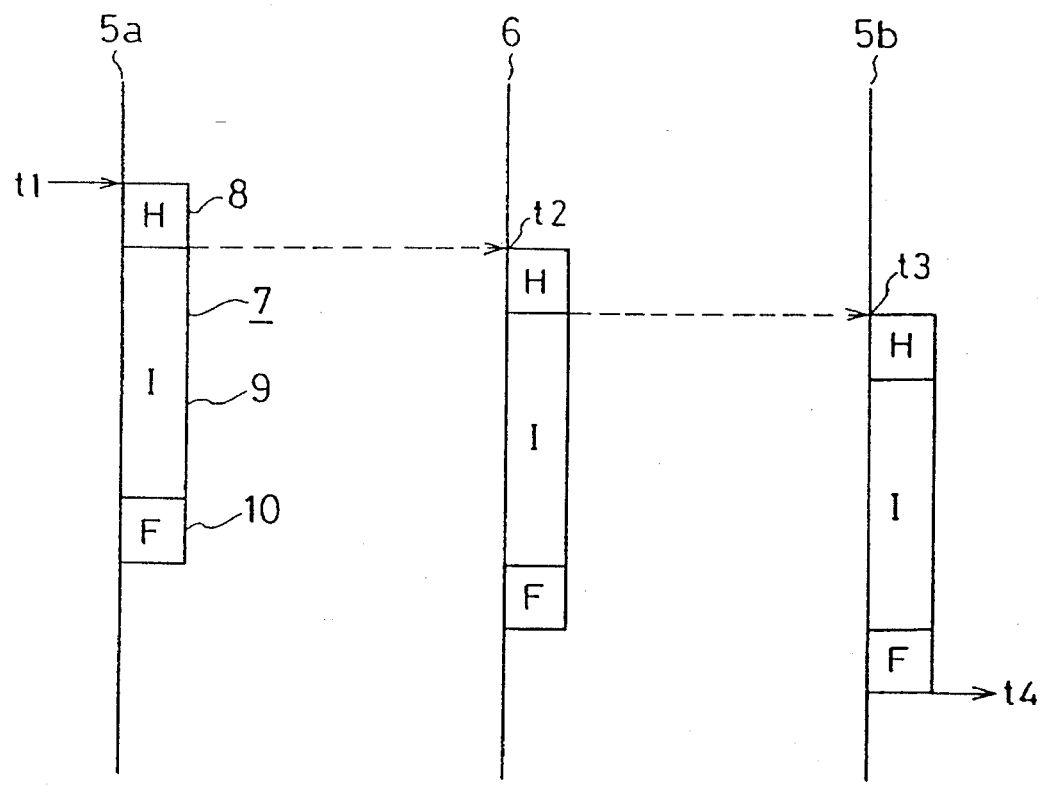
FIG. 33 shows a transfer time sequence chart of a conventional semi store-and-forward switching method.
Figure 34:
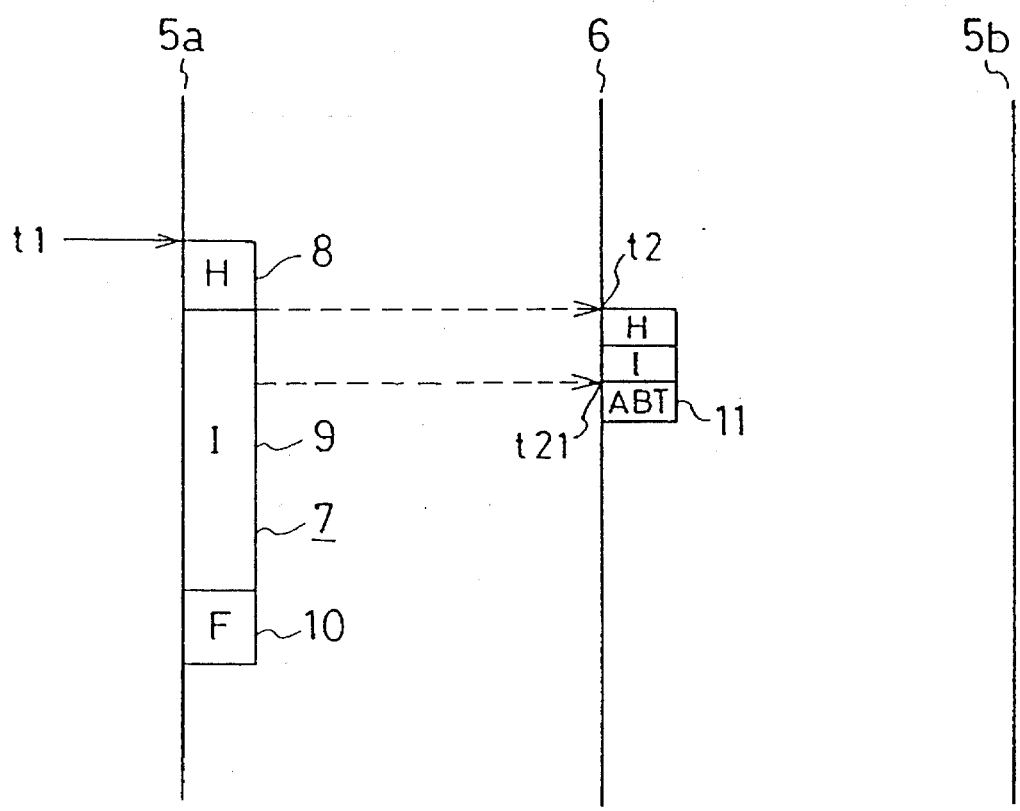
FIG. 34 shows a time sequence chart to explain the inconvenience in the conventional semi store-and-forward switching method.

The frame relay apparatus of this embodiment is used in a network which is similar to the conventional frame relay network shown in FIG. 32. In FIG. 1, time sequences $5a$, 6 and $5b$ of a frame which is transmitted in the transmission lines $3a$, 4 and $3b$ are shown. Time t1, t2 and t3 are same as in the explanation of the related art.

Figure 2:
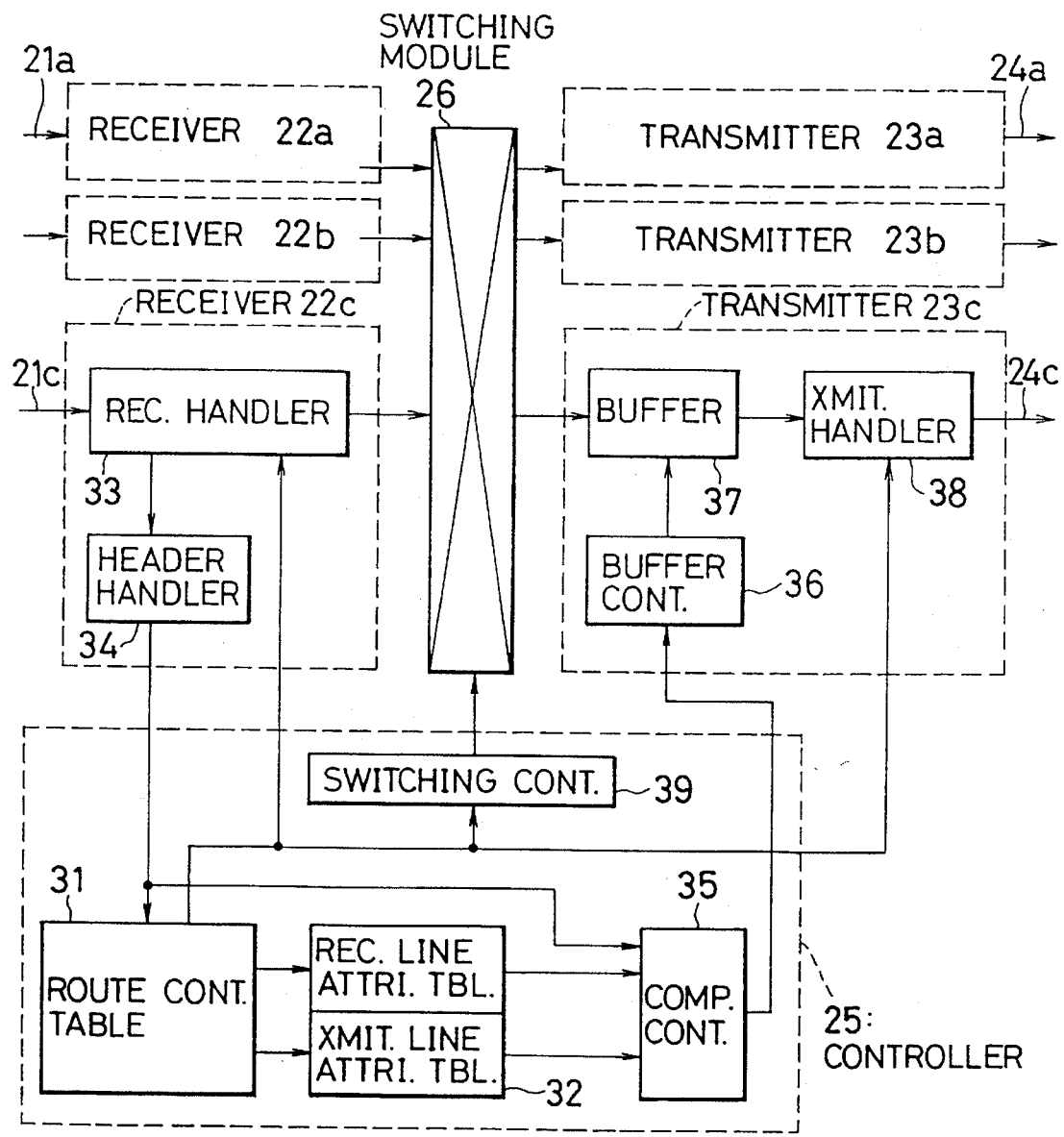
FIG. 2 shows a configuration chart of a frame relay apparatus of an embodiment of this invention.

FIG. 2 is a configuration chart of a frame relay apparatus as an embodiment of this invention. In FIG. 2, input lines $21a$–$21c$, receivers $22a$–$22c$, transmitters $23a$–$23c$, output lines $24a$–$24c$, a controller 25 and a switching module 26 are shown. Each input line and each output line is connected to each transmission line. Each frame relay apparatus receives data via each input line and transmits data via each output line. Explanations on elements in each receiver, transmitter and the controller are made later together with the explanation on the operation.

FIGS. 3 $(a)$–$3(b)$ show a sample of stored information in a route control table 31 and a receiving and transmitting line attribute table 32 in the controller.

A set of receiving line number 41, received logical link number (also called as a data link connection identifier ("DLCI") of the received frame) 42, transmitting line number 43 and transmitting logical link number (also called as a data link connection identifier ("DLCI") of the transmitting frame) 44 is stored in the route control table 31. The transmission rate of each transmission line is stored in the receiving and transmitting line attribute table 32. The receiving line and the transmitting line are used separately for the convenience of explanation. Practically, the transmission rate of each line are stored in the receiving and transmitting line attribute table.

FIG. 4 $(a)$ shows a sample content of stored information in the route control table 31 shown in FIG. 3 $(a)$. As shown in FIG. 4 $(a)$, L1, L2 ... L5, L6, ... are stored as line numbers. Multiple logical links may be provided for each line. For example, two logical links, logical link number 1 and logical link number 2 are provided for the line number L1. In the route control table shown in FIG. 4 $(a)$, the received logical link number 1 of the receiving line number L1 is stored corresponding to the transmitting logical link number 1 of the transmitting line number L5.

FIG. 4 $(b)$ shows a sample of the receiving and transmitting line attribute table 32. In this example, the receiving and transmitting line attribute table 32 stores that the line number L1 has a rate R1 and the line number L2 has a rate R2.

An operation of embodiment with the above principal configuration is as follows.

The operation is the same regardless of which receiver and which transmitter are used. Therefore, the following explanation is made for the case where the receiver $22c$ and the transmitter $23c$ are used.

The receiver $22c$ receives the frame 7 through the input line $21c$. When the receiver $22c$ receives the header 8, a header handler 34 notifies the controller 25 of the received logical link number. When the header includes information of the frame length, the header handler also notifies the controller 25 of the frame length. The controller 25 recognizes the receiving line number by the notice from the receiver $22c$ and determines the output line on which to transmit and the transmitting logical link number in accordance with the information in the route control table 31. Furthermore, the controller checks the line number 45 and the rates 46 of the receiving line and the transmitting line in reference with the receiving and transmitting line attribute table 32.

The frame relay apparatus according to this embodiment receives the data, decides the frame length of the received frame, and decides the transmitting line by referring to the route control table which indicates the correspondence between the receiving line and the transmitting line in order to transmit data based on the content of the received data. Consequently, a transmitting rate of the input signal and a transmitting rate of the output signal are decided according to the line attribute table.

The controller 25 also controls the switching module 26 with the switching controller 39 and connects the receiver $22c$ to the transmitter $23c$ correctly. With a comparison controller 35, the controller 25 calculates a required buffering amount based on the transmitting rates of the input signal and the output signal and information on the frame length stored in the header 8 and notifies the transmitter $23c$ of the required buffering amount. The buffering amount is same as a frame store time 12 in FIG. 1 and the frame store time can be notified to the transmitter $23c$.

In the frame relay apparatus of this embodiment, the buffering amount for the sending buffer is calculated based on the rates by the compare and control means. Basically, when the transmitting rate of the output signal is higher, the sending data is transmitted after It is stored for the calculated amount by the transmitting handler means. When the transmitting rate of the input signal is higher or equal to the transmitting rate of the output signal, the sending data is transmitted immediately without being stored. For example, in such case, buffer 37 may bypass the data.

When the transmitter $23c$ is instructed on the buffering amount by the controller 25, the transmitter $23c$ changes the buffering amount in a sending buffer 37 by the buffer controller 36 and stores the received data. The transmitter starts a transmission after the frame store time 12 is passed from the time t2 when the header 8 is received as shown in FIG. 1.

In this method, the transmitter $23c$ is able to complete a transmission at the same time with the receipt of the frame check sequence 10 of the received data. Consequently, a transmission underrun doesn't occur in this method.

In FIG. 1, the next FR apparatus starts a transmission to the next terminal $1b$ at the time t3 when the FR apparatus receives the whole header 8 and completes a transmission at the time t4. As described, even if the rates of the communication lines are different, a transmission underrun is prevented and a communication time is shortened.

Embodiment 2

The controller 25 of the frame relay apparatus must define the buffering amount, i.e., the frame store time 12, appropriately. When the amount is too large, the transmission underrun is prevented. However, the communication latency becomes intolerable and the communication time efficiency drops. In contrast, when the amount is too small, the transmission underrun occurs frequently and the probability of a communication frame loss increases.

The transmission underrun occurs most often, when the rates of the transmission lines are different and the communicating frame length is long. That means, when the frame store time 12 is long enough to prevent the transmission underrun even for a maximum frame length, all the frames are transmitted without underrun.

In FIG. 5 (a), a relationship of the transmitting rate of the input signal $R_r$, transmitting rate of the output signal $R_s$, maximum frame length $L_n$, frame header length $L_h$, FCS length $L_f$ and the required frame store time $T_f$ are shown. The frame store time 12 which doesn't cause a transmission underrun should be defined at $T_f$, which may be gotten by the following formula (1):

$$T_f = (L_n + L_f)/R_r - (L_h + L_m)/R_s \qquad (1)$$

In embodiment 1, the controller 25 is able to calculate the appropriate frame store time by the formula (1) in advance, when the maximum frame length is defined for a set of the received logical link number and the transmitting logical link number.

FIG. 5 (b) shows a case where the maximum frame length 47 is stored in the route control table 31. The frame store time 12 may also be defined by referring to the maximum frame length 47. Furthermore, the frame store time may also be calculated in advance and stored separately for each logical link number.

In this method, the communication time efficiency drops slightly when a communication frame which is shorter than the maximum frame length is transmitted. However, the handling is simple as a calculation is not necessary in each frame relay.

Embodiment 3

In embodiment 1, the header 8 accompanies the information on the frame length. However, it is not rare that the frame length is gotten only when the source and destination of the frame relay is set, i.e., the source and destination of the communication frame. In such a case, an additional column of the frame length is provided in the route control table, and the comparison controller may instruct the transmitter on the buffering amount in reference with the information In the route control table.

FIG. 6 (a) shows a format of a frame. A destination 8d and a source 8s are written in the header 8 of the frame. It is assumed that the frame relay apparatus has primary information to decide the frame length based on a combination of the source and the destination in advance. Therefore, the frame relay apparatus may recognize the frame length from the source 8s and the destination 8d written in the header 8 of the frame. The recognized frame length is written as the frame length 47a in the route control table 31, as shown in FIG. 6 (b). The comparison controller is able to calculate the frame store time with the frame length based on the formula (1).

Furthermore, a receiving buffer may also be provided instead of the sending buffer 37 in order to store the received data and transmit the data to the transmitter after the designated frame store time 12 is passed.

Embodiment 4

Another example in which the header carries the information on the frame length is explained.

In the frame relay (FR), if the network layer protocol of the transferring communication frame is Internet Protocol (IP), a total length field is set in IP header that follows the FR header. In this case, the frame length is gotten from the information on the total length field.

A composition of this example is as follows. The header handler 34 in FIG. 2 gets the total length from the total length field and transmits it to the comparison controller 35. The comparison controller 35 calculates the frame store time 12 based on the received information and values in the line attribute table 32 and transmits the result to the transmitter. The rest of the operation is same as embodiment 1.

Figure 7:
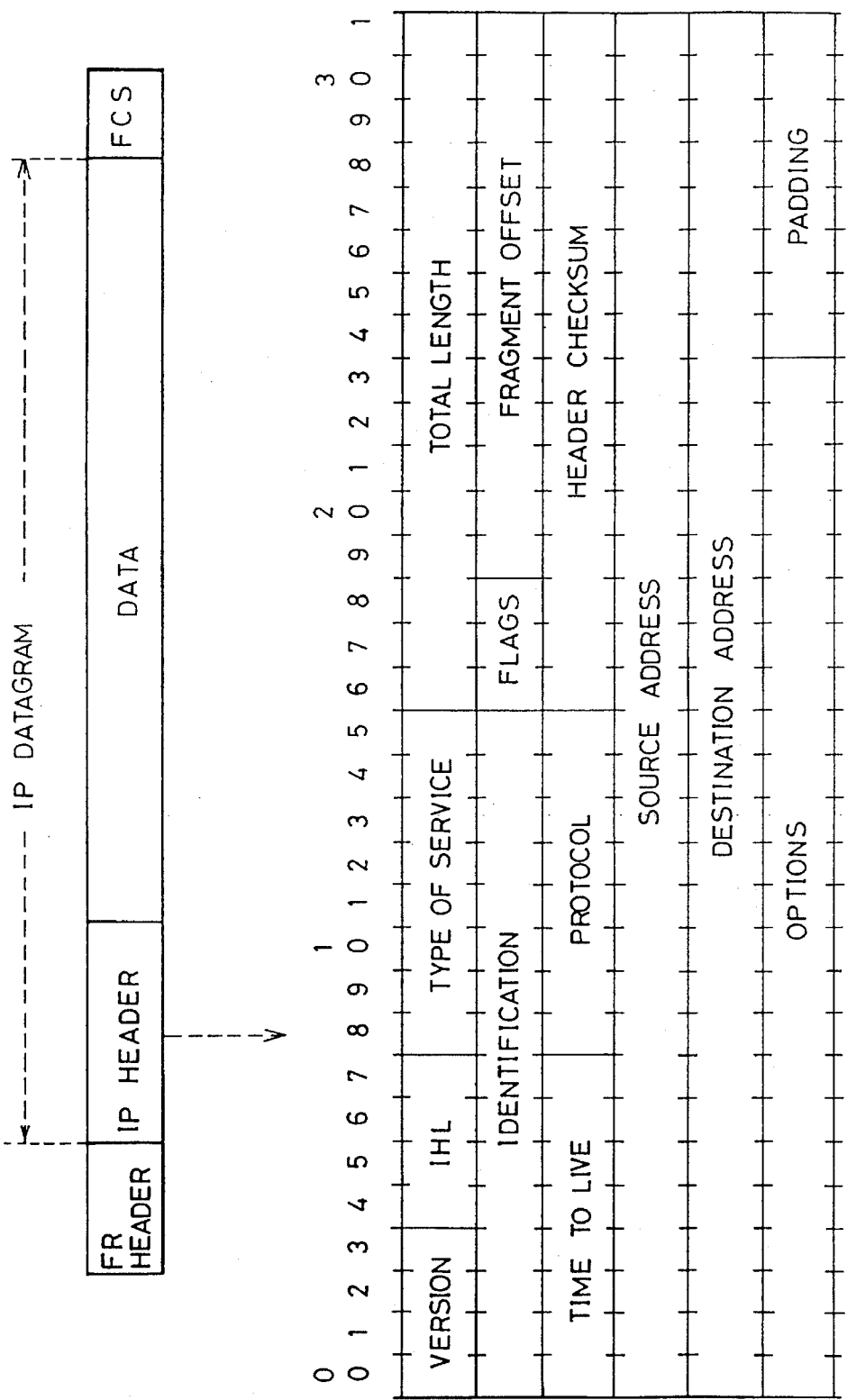
FIG. 7 shows a format of an IP header.

FIG. 7 shows a format of the IP header. When the information on the total length field is not extracted correctly in the IP header, the previous frame length or the maximum frame length may be used instead.

Embodiment 5

Figure 8:
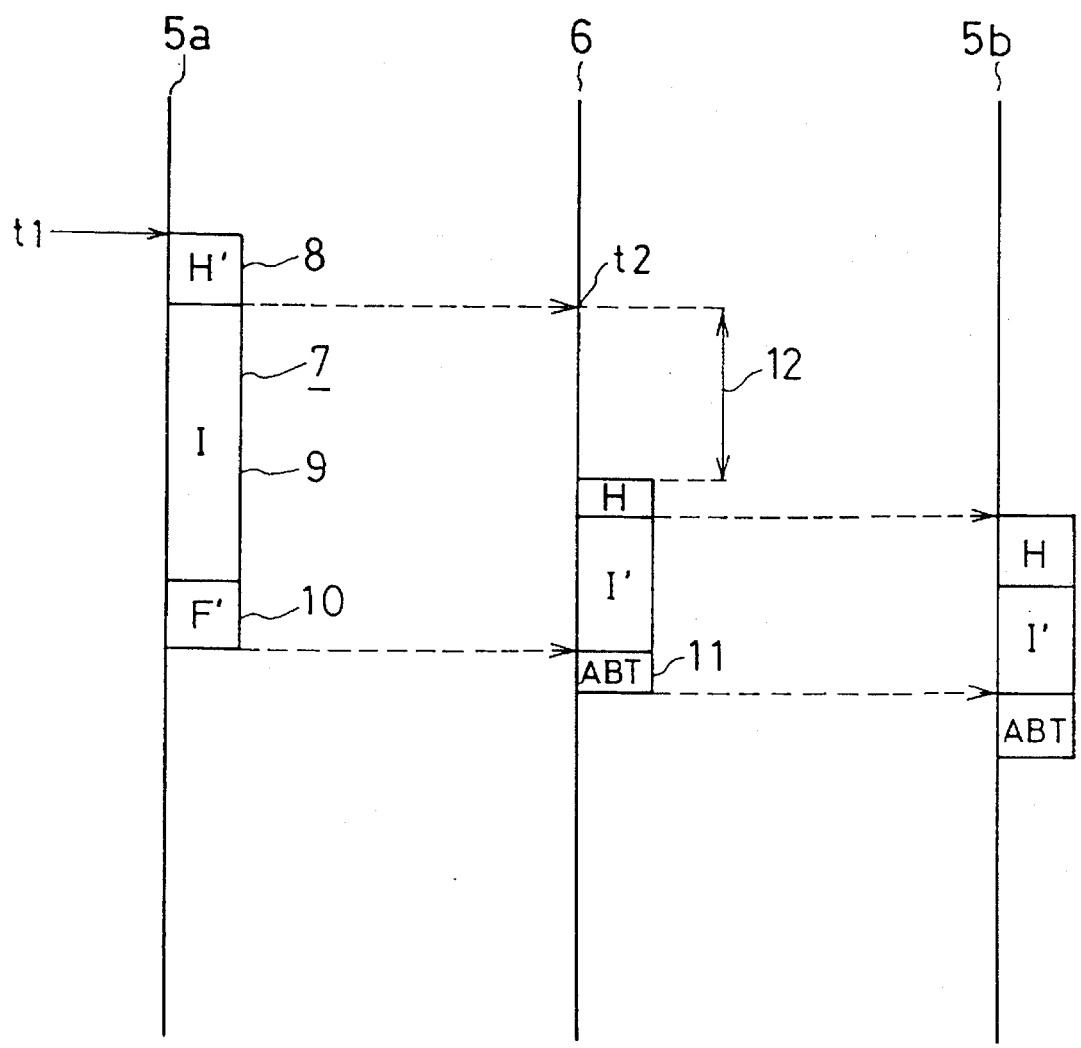
FIG. 8 shows a transfer time sequence in case that a FCS error is occurred in embodiment 5.

When the transmission and receipt is not made normally in the above embodiment, the following process may be used. FIG. 8 shows a transfer sequence In a case in which an error is detected by checking the FCS in the received communication frame.

Figure 9:
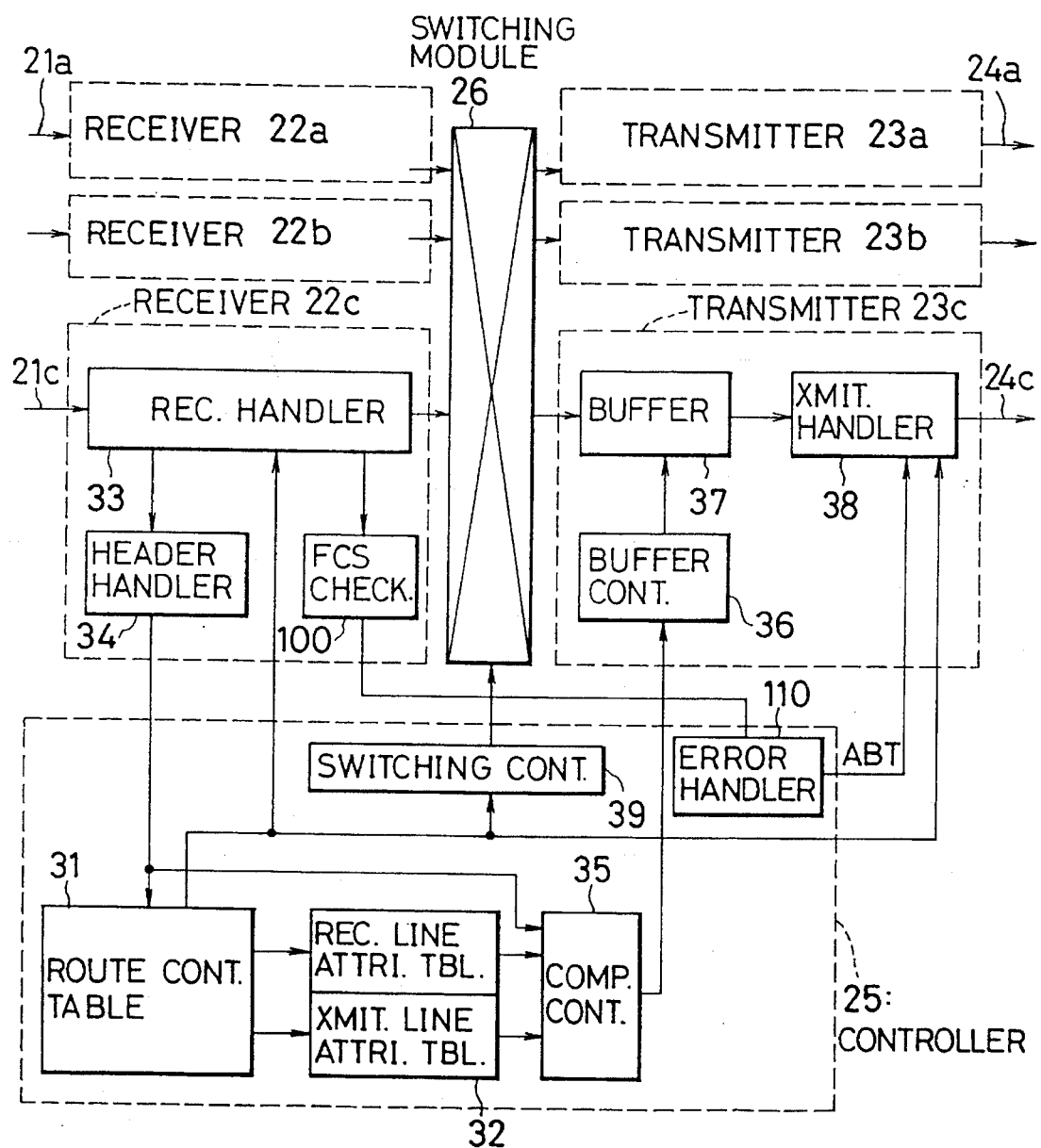
FIG. 9 shows a configuration chart of the frame relay apparatus of embodiment 5.

FIG. 9 is a configuration chart of the frame relay apparatus of this embodiment. A FCS checker 100 checks a received FCS of the frame. An error handler 110 generates an abort signal for the transmitter in response to an error report from the FCS checker 100. As described, in the frame relay apparatus of this embodiment, when an error is detected with the received FCS, an abort signal is generated in the controller and is transmitted from the transmitter to the destination.

In this embodiment, the transmission is started before the FCS of the received frame is checked and confirmed. Therefore, when the received frame is wrong, that must be notified to the destination. This means that the FCS should not be sent to the destination before the receiving FCS is checked, as shown in the transfer sequence 6 of the relay line 4 of FIG. 1 and FIG. 5.

If the received FCS is normal, the controller 25 calculates a new FCS based on the renewed header and transmits the new FCS to the destination by including it in the header.

FIG. 8 shows an error sequence of this embodiment. When an error is detected in a communication frame by referring to the receiving FCS at the time of a transmission of the frame, or when an abort signal is received, an abort signal 11 is generated and sent to the destination to notify of the error immediately. When the abort signal 11 reaches the destination, the communication frame is discarded.

In the frame relay apparatus of this embodiment, the FCS is checked. When a FCS error is detected, the sending buffer is cleared, if it is before transmitting. Meanwhile, only abort is transmitted, if it is after transmitting.

Embodiment 6

Following is another process that may be taken when the transmission and receipt is not made normally. In embodiment 5, the transmission starts even before the whole frame is received. In embodiment 6, the relay multiplexes multiple frames in the transmitting line from multiple transmission sources (receiving sources) to multiple destinations (multiple terminals, for example).

Figure 10:
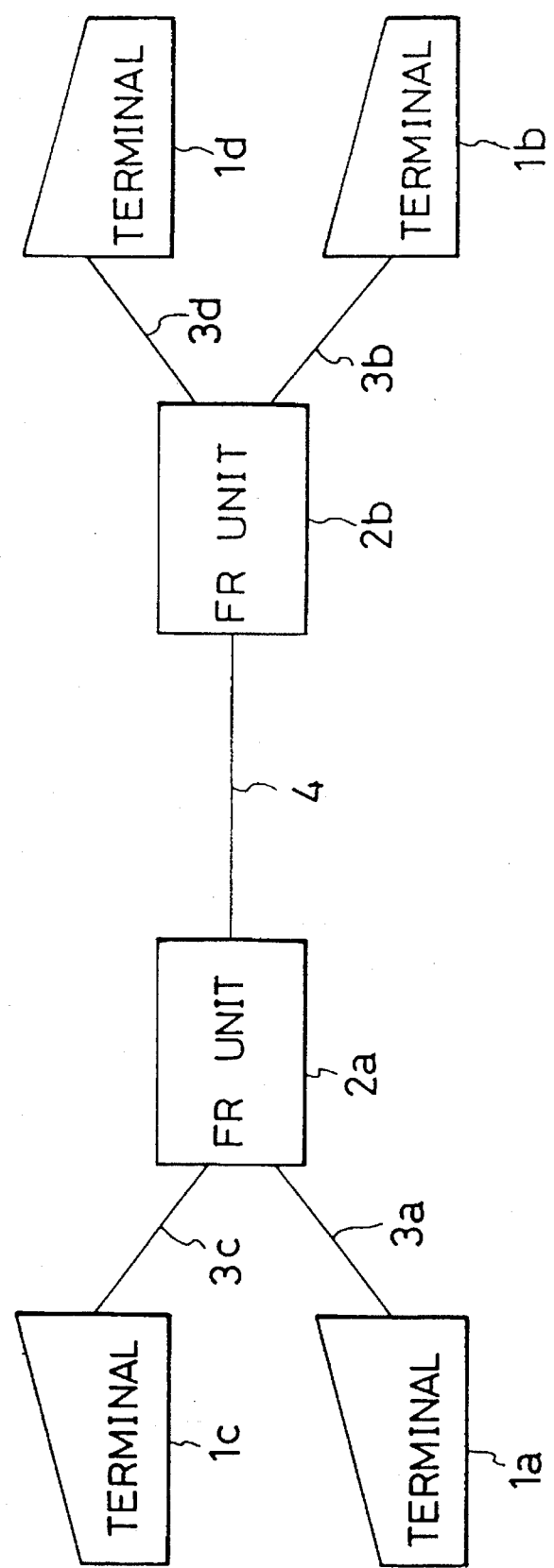
FIG. 10 shows a system configuration chart of embodiment 6.

FIG. 10 shows a system configuration chart of embodiment 6. In FIG. 10, the terminal 1a and 1c transmit information to the terminal 1b and 1d, respectively, through the access lines 3a and 3c, the relay line 4, and the access lines 3b and 3d.

Figure 11:
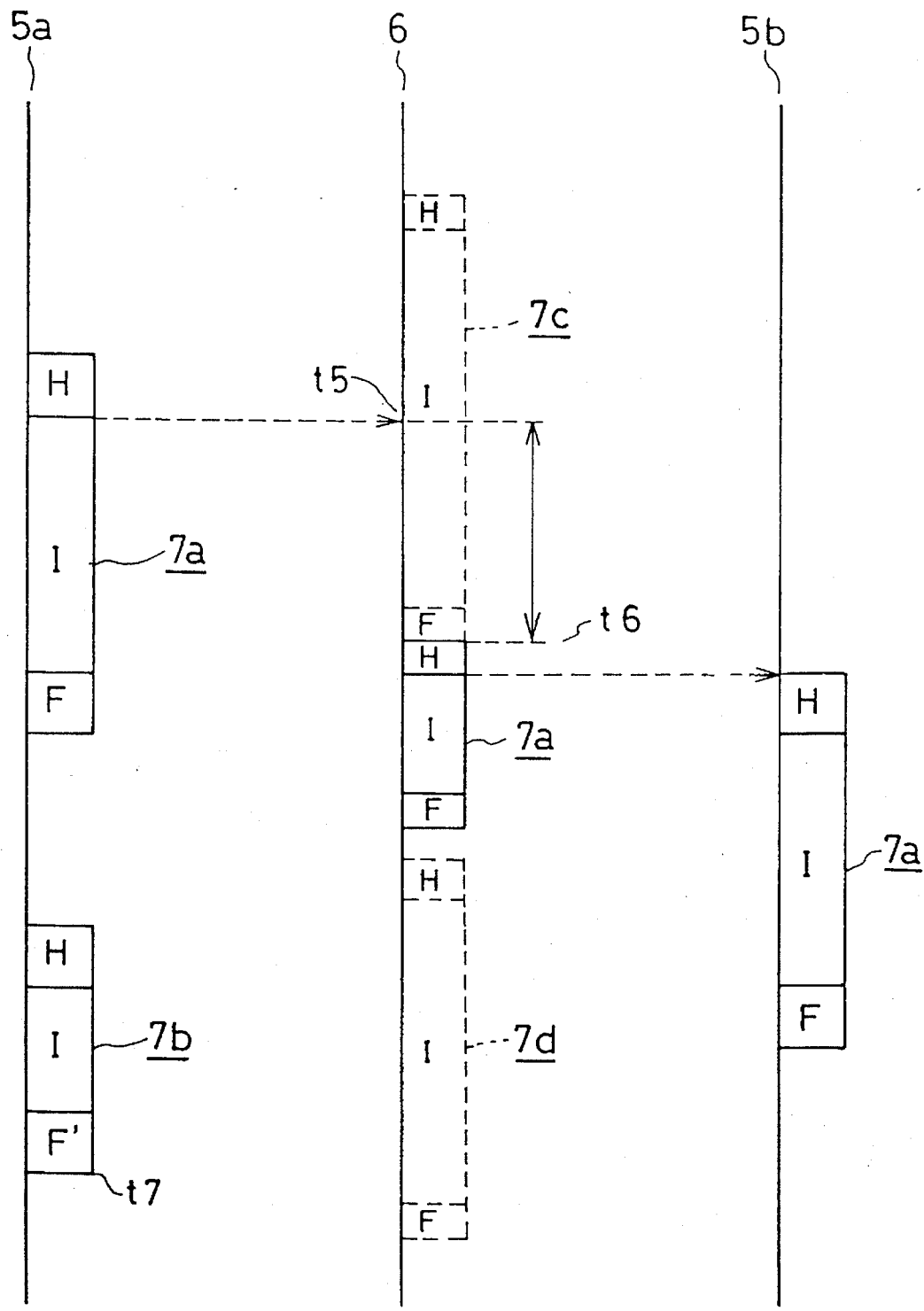
FIG. 11 shows a time sequence in case that a FCS error is occurred in embodiment 6.

FIG. 11 shows a frame transfer sequence of embodiment 6. The frame transfer sequence 5a, 6 and 5b are shown for the input line to the FR apparatus 2a, the relay line 4, and the output line from the FR apparatus 2b. In FIG. 11, the terminal 1a transmits the frames 7a and 7b to the terminal 1b. The terminal 1c transmits the frame 7c and 7d to the terminal 1d.

Figure 12:
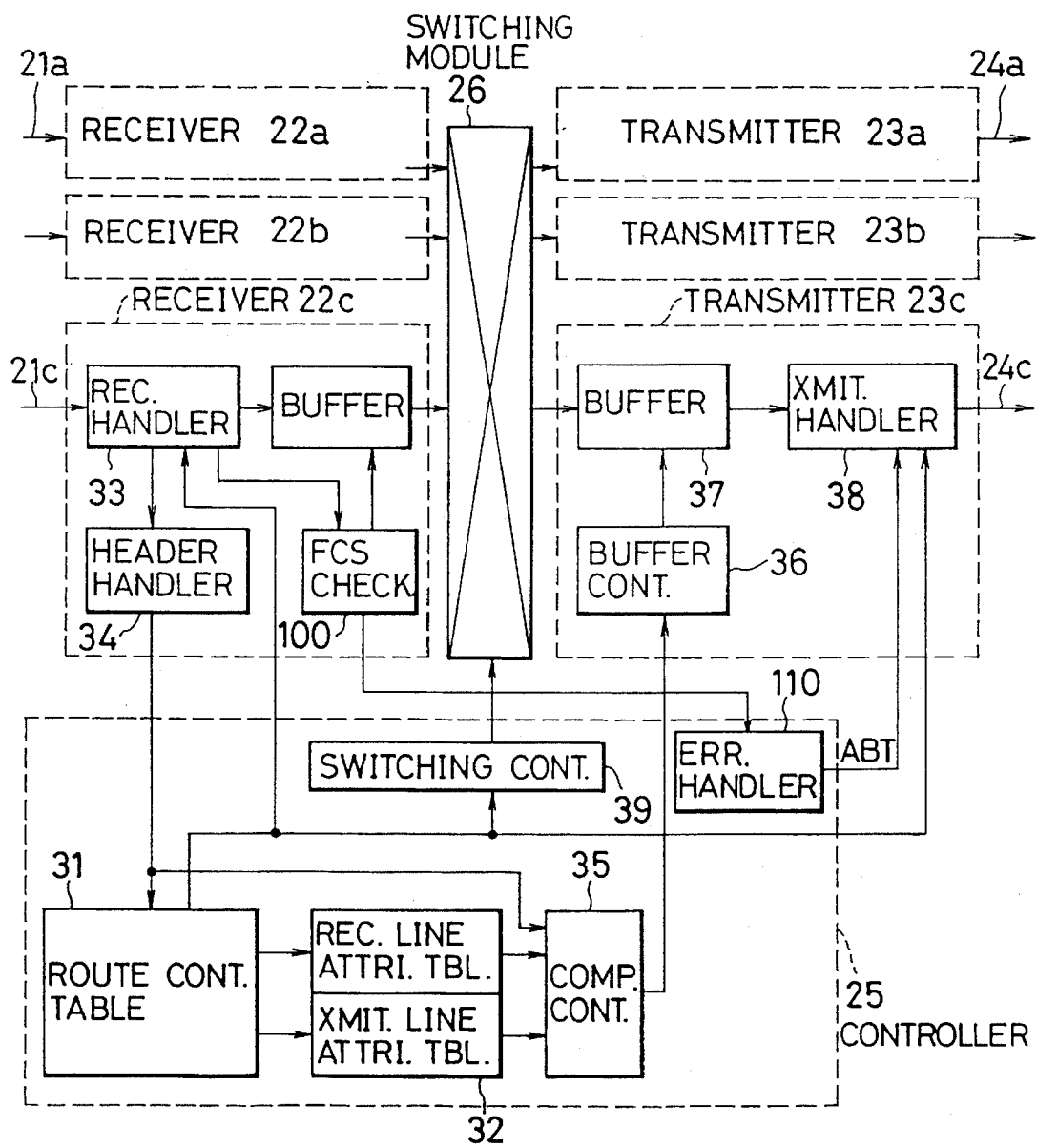
FIG. 12 shows a configuration chart of the frame relay apparatus of embodiment 6.

Furthermore, as shown in FIG. 12, the frame relay apparatus includes a buffer 120 to store the received information in the receiver 22c. When a receiving error is found before the transmission starts, the received data in the buffer are discarded. Such function is added.

The operation is as follows. In FIG. 11, when the FR apparatus 2a receives the header 8 of the frame 7a at time t5, the FR apparatus 2a is transmitting the frame 7c which is received from the terminal 1c to the FR apparatus 2b via the relay line 4. Therefore, the FR apparatus 2a is unable to transmit the frame 7a to the FR apparatus 2b at the time t5. When the transmission of the frame 7c is completed at time t6 and a calculated frame store time for the frame 7a is passed after t5, the transmission of the frame 7a starts.

FIG. 11 also shows a case where the FR apparatus 2a receives the whole frame 7b from the terminal 1a, while the FR apparatus 2a is transmitting the frame 7b which is received from the terminal 1c in advance to the terminal 1d. When an error is detected by checking the FCS of the frame 7b, the FR apparatus 2a discards the received frame 7b which is held in the buffer to be transmitted.

In this method, the relay operation is completed during the waiting of the frame transmission. Therefore, the transfer time loss diminishes. Furthermore, since no invalid frame is transmitted, line efficiency doesn't drop.

Embodiment 7

The frame relay apparatus of this embodiment is now explained. This is another example of when the transmission is not made normally.

Figure 13:
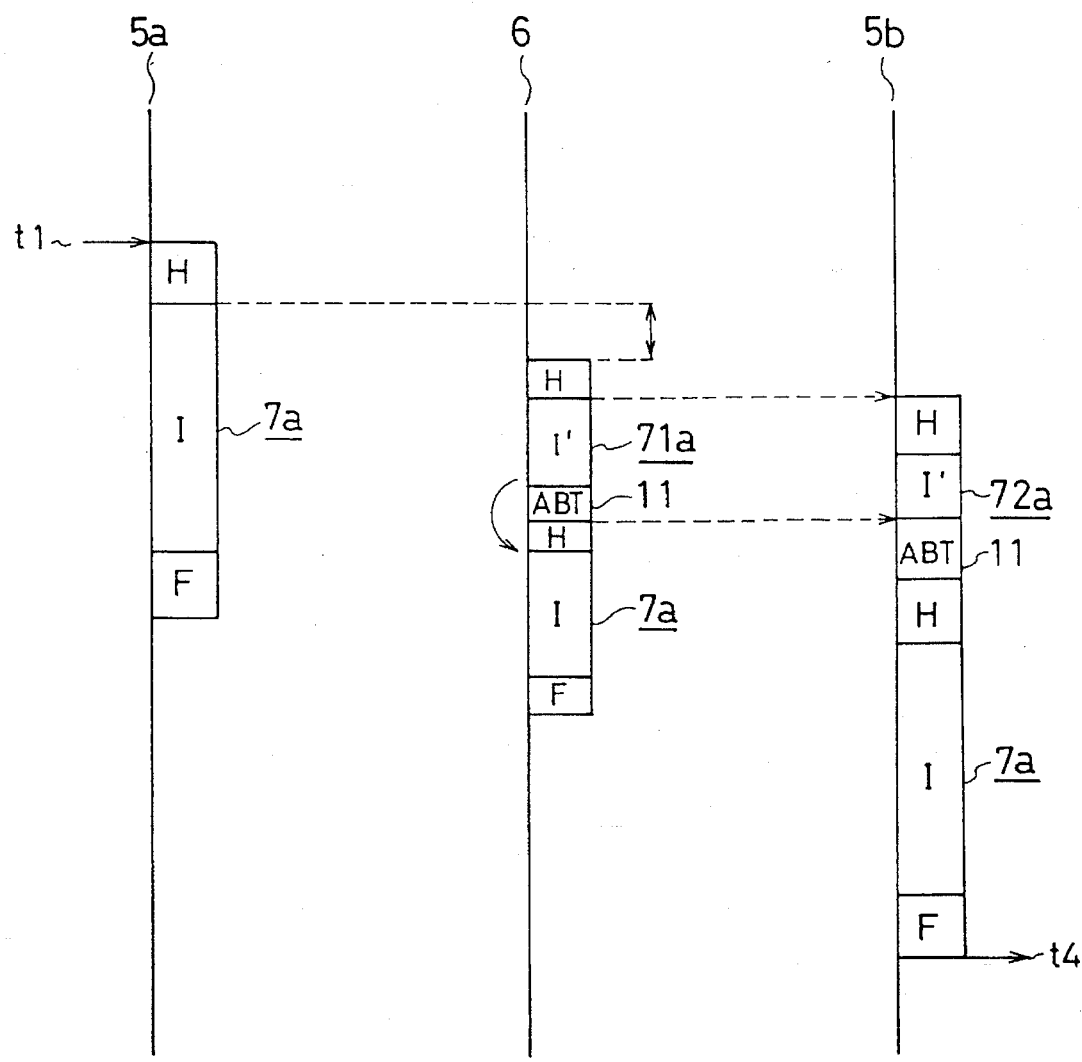
FIG. 13 shows a time sequence in case that an abort occurs in embodiment 7.

FIG. 13 shows a transfer time sequence when the frame 7a is received, a transmission underrun occurs while the frame 7a is transmitted, and the frame 7a is re-transmitted. The frame that is discarded by an abort signal is shown as 71a and 72a.

Figure 14:
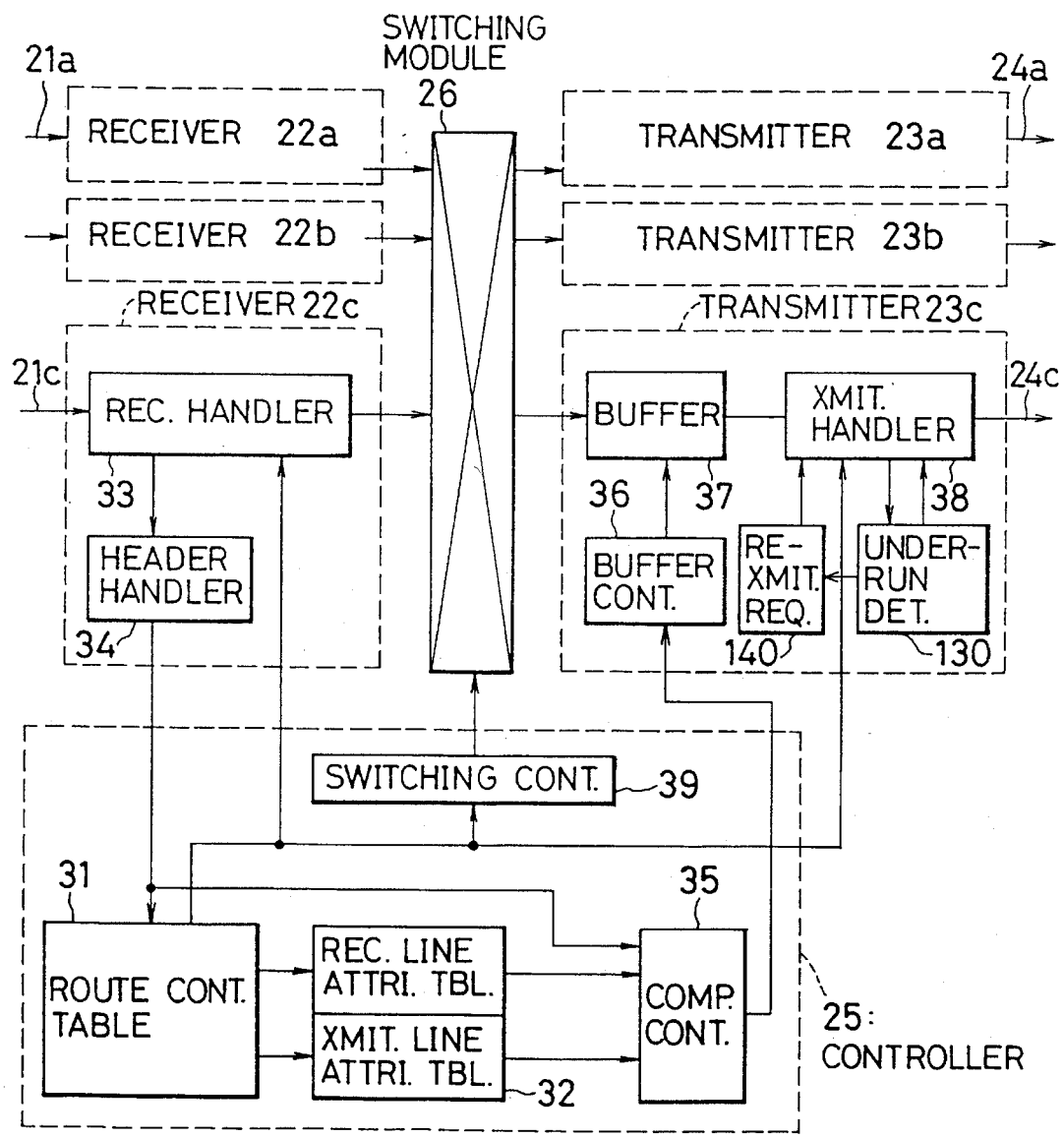
FIG. 14 shows a configuration chart of the frame relay apparatus of embodiment 7.

FIG. 14 shows the configuration of the frame relay apparatus. The frame relay apparatus includes a transmission underrun detector 130 to detect an underrun in the transmitter and a re-transmission requestor 140 to re-transmit the frame from the sending buffer to the transmitting handler 38 when a transmission underrun is detected.

The operation is as follows. In embodiment 7, the frame relay apparatus transmits an abort signal and discards the transmission of the frame as soon as an underrun of a frame occurs at a transmission time. The frame is re-transmitted from the start data of the frame stored in the buffer.

A buffer 37 continues to hold the data of the frame until a normal transmission of the frame is confirmed. Therefore, when a re-transmission requestor 140 requests a re-transmission, the frame is able to be re-transmitted from the start data.

In the frame relay apparatus of this embodiment, the apparatus receives the data and decides the frame length of the received frame and the transmitting line by referring to the route control table 31 which indicates the correspondence between the receiving line and the transmitting line to transmit data based on the content of the received data. Consequently, a transmitting rate of the input signal and a transmitting rate of the output signal are decided according to the line attribute table 32.

Furthermore, the buffering amount for the sending buffer is decided based on the data in the route control table. When the transmitting rate of the input signal is higher or equal to the rate of the transmitting line, the sending data is transmitted immediately without being stored. When the transmitting rate of the output signal is higher, the sending data is transmitted after it is stored for the predefined amount by the transmitting handler 38. In case a transmission underrun occurs, an abort is transmitted. Then, the data is re-transmitted from the start of the sending buffer.

In this way, the re-transmission is made in a minimum time and the transfer time of the whole frame is shortened.

Embodiment 8

As described in embodiment 7, improving a transfer time efficiency, by shortening the total transmission time, and upgrading a credibility of a data transfer, by re-transmitting information in case of a transmission error occurrence, introduces conflicting goals from the prospective of the line usage efficiency. Therefore, the frame relay network employs the semi store-and-forward relay method that should improve the transfer time efficiency. Meanwhile, for the terminals which are outside of the frame relay, the previous frame relay apparatus employs the full store-and-forward relay method that should lighten a burden of the re-transmission and improve the efficiency of the access lines.

Figure 15:
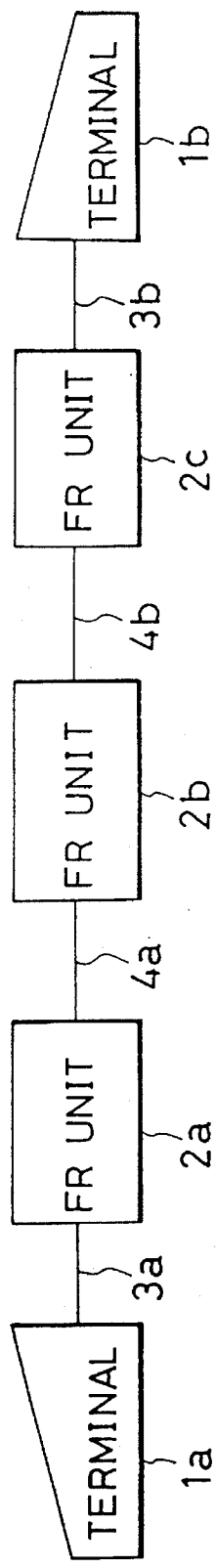
FIGS. 15 (a)–15 (b) show a chart to show a sample of the route control table in embodiment 8 and a network configuration chart of the frame relay apparatus of this invention.

In the frame relay apparatus of embodiment 8, when the destination of the transmitting line is an apparatus located outside the frame relay network, the route control table 31 contains an outside range column 48 to indicate that the destination is outside the range, for example. FIG. 15 (a) shows a sample description of the outside range column in the route control table.

Figure 16:
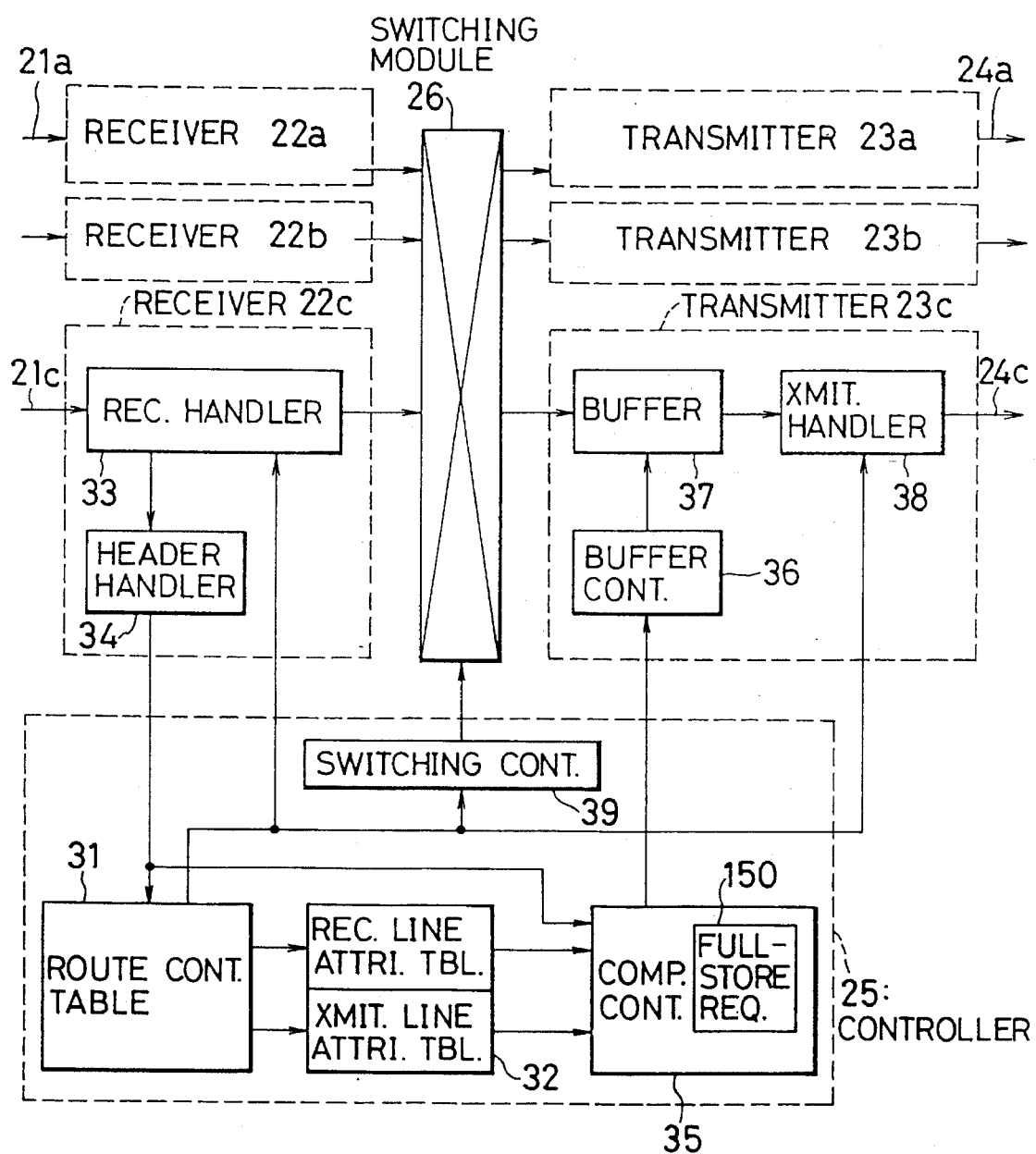
FIG. 16 shows a configuration chart of the frame relay apparatus of embodiment 8.

Furthermore, as shown In FIG. 16, the comparison controller 35 has a full-store requestor 150 to instruct the transmitter to store the full receiving data before transmitting, when the route control table indicates that the destination is outside the range of the network.

Figure 17:
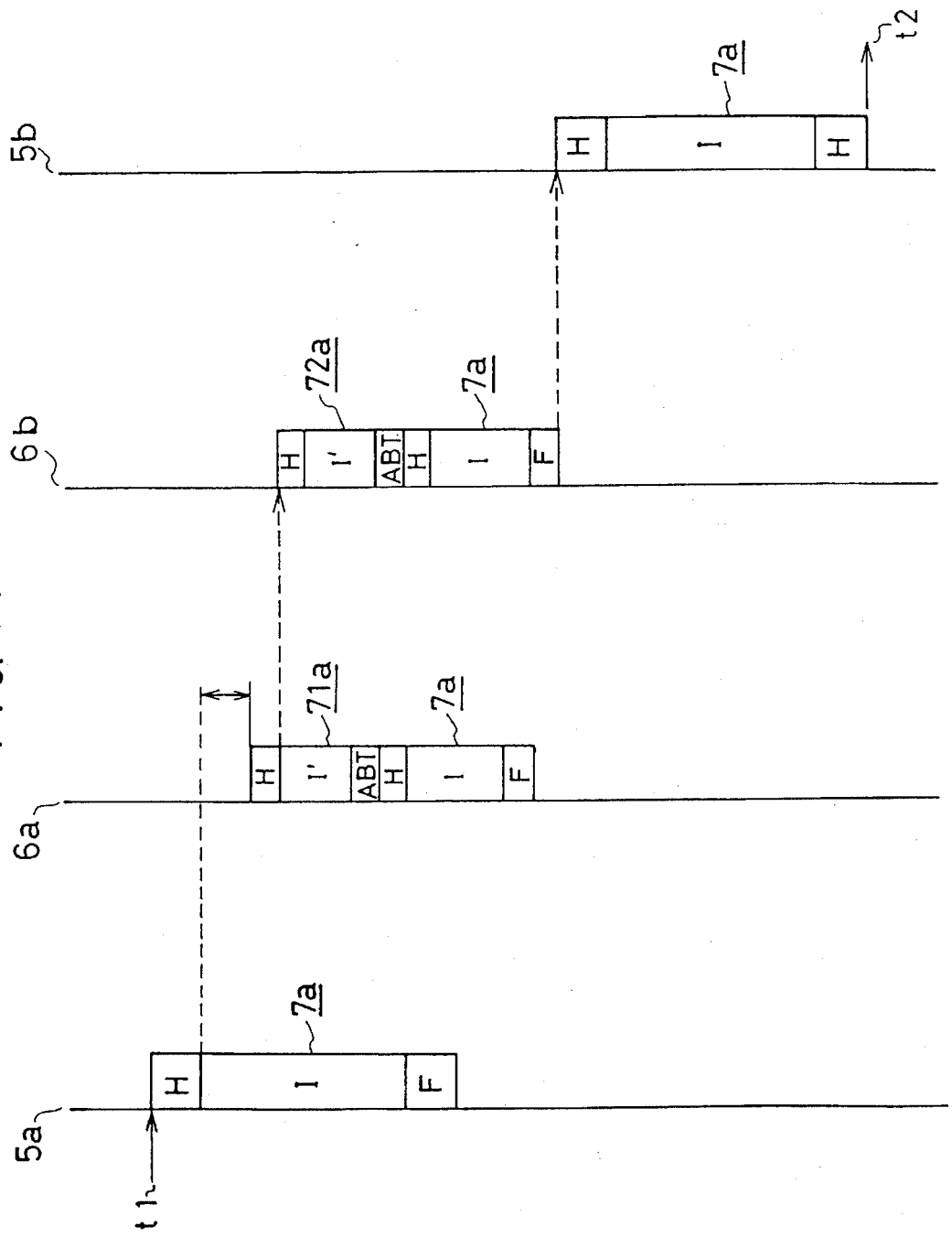
FIG. 17 shows a transfer time sequence of each line in the configuration shown in the FIG. 15.

The operation is explained by using FIG. 15, FIG. 16 and FIG. 17. FIG. 15 (b) is a configuration chart of the network in which the frame relay apparatus of this invention is employed. In FIG. 15 (b), the FR apparatuses 2a–2c compose the frame relay network, and the terminal 1b is outside the range of the frame relay network.

FIG. 17 is a transfer time sequence chart of each line composing the network shown in FIG. 15 and FIG. 16. FIG. 17 illustrates transfer time sequence 5a and 5b for the access lines 3a and 3b in FIG. 15, and illustrates transfer time sequence 6a and 6b for the relay line 4a and 4b.

In the frame relay apparatus of this embodiment, when the FR apparatus 2c finds that the destination of the frame relay is the terminal 1b, which is outside the range by referring to the outside range column 48 in the route control table 31, the FR apparatus 2c does not transmit the received frame 72a at once and discards the frame 72a by receiving an abort signal. The FR apparatus transmits the frame to the terminal outside the frame relay range only after the FR apparatus receives the re-transmitted frame 7a normally and recognizes that the FCS is confirmed to be normal. This transmission completes at the time t2.

In this operation, the transfer time of the frame 7 increases. However, since the frame is full-stored only once in the last frame relay apparatus, the store time increases only in the amount of one frame and the terminal 1b is exempted from the re-transmission operation.

In the frame relay apparatus of this embodiment, the apparatus is located at an exit of transmitting data to the outside of the frame relay network. The received data is stored once fully and transmitted after FCS is completed.

Embodiment 9

This invention may be applied to a case where a communication frame does not have frame length information. In such a case, a maximum frame length may be used. Further, in this embodiment, it is possible to provide the frame relay apparatus which always has an efficient communication time.

In a basic operation of this embodiment, an unutilized amount of the buffer 37 is checked in each transmission time. If the unutilized buffer amount is more than a predefined amount, the next buffering amount is lessened. If a transmission underrun occurs, the next buffering amount is increased by a certain amount. In this way, the next buffering amount is always controlled.

In the frame relay apparatus of the embodiment, the buffering amount of the sending buffer is lessened, if the remaining buffer exists at the previous frame transmission time. In contrast, the buffering amount is increased, if an underrun occurs at the previous frame transmission time.

Figure 18:
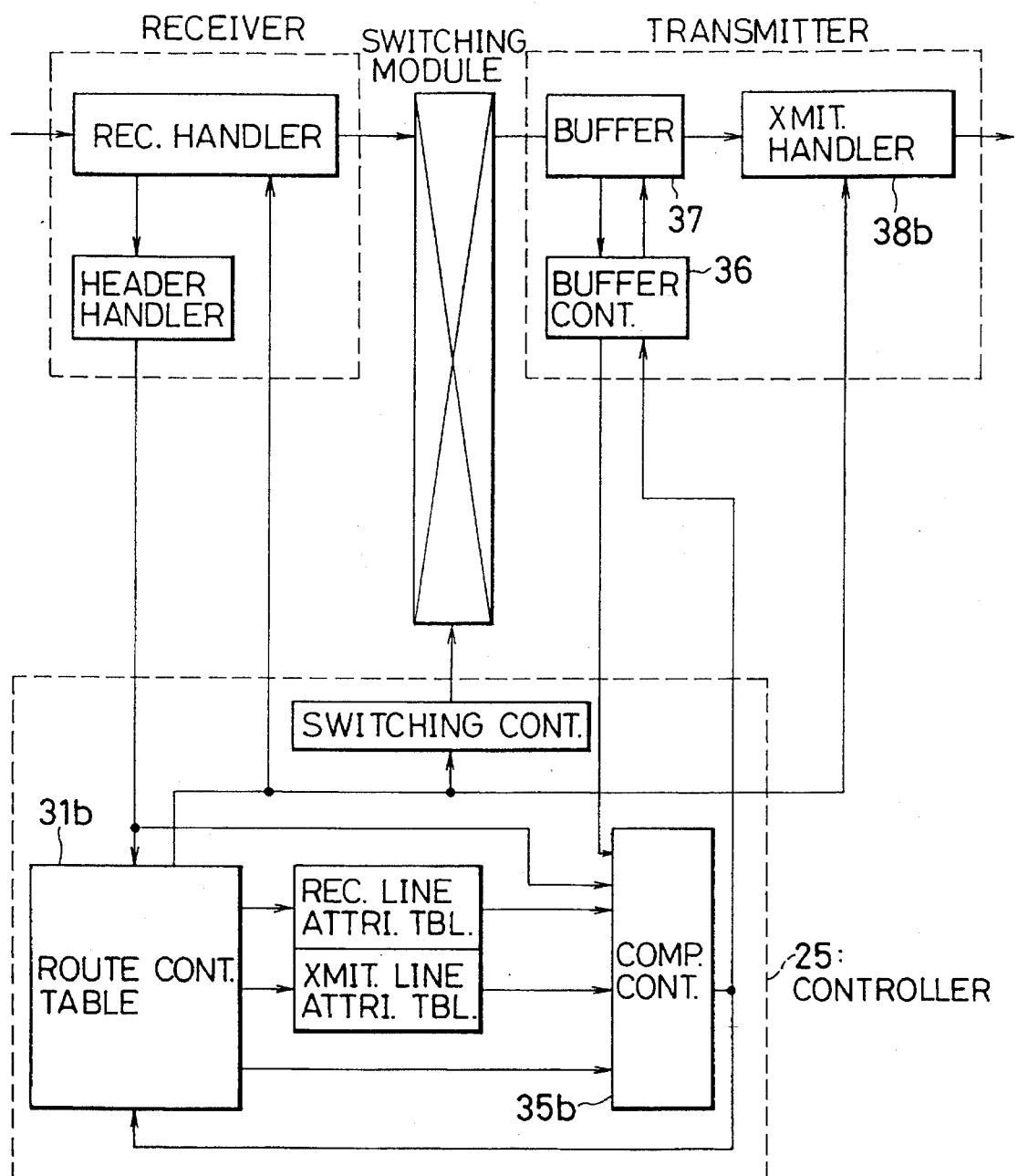
FIG. 18 shows a configuration chart of the frame relay apparatus of embodiment 9.

FIG. 18 shows a configuration chart of the frame relay apparatus which includes a function to control the buffer length based on the past data. The frame relay apparatus has a transmitting handler 38b which controls the buffer length adaptively. In FIG. 18, the route control table 31b contains a buffering amount column 49 to indicate the next buffering amount corresponding to a set of a transmitting line number and a transmitting logical link number as shown in FIG. 19 (a).

Figures 19A, 19B:
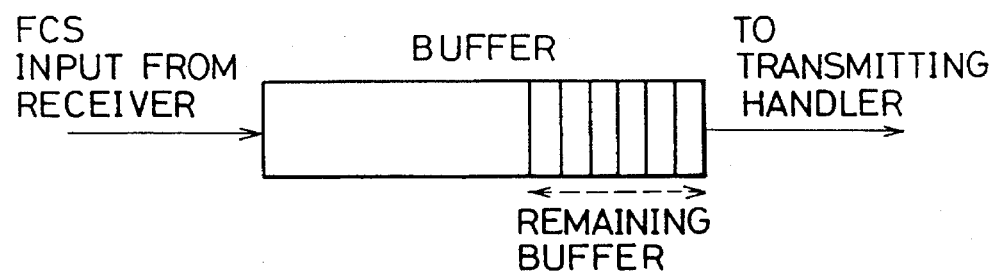
FIGS. 19 (a)–19 (b) show a chart to show a sample of the route control table of the FIG. 18 and a chart to explain an operation to detect remaining buffering amount.

FIG. 19 (b) explains an operation to detect the remaining buffer amount of the buffer 37.

The operation is as follows. When the frame length is initially unknown, the maximum frame length is used for the next buffering amount. A receiving operation is the same as in embodiment 1. The comparison controller 35b instructs the buffer controller 36 of the buffering amount by referring to the next buffering amount of the corresponding logical link number in the route control table 31b. Consequently, the transmitter starts a transmission after a required store time. The comparison controller 35b checks the remaining buffering amount of the buffer 37, when a FCS is input from the receiver, for example. When the remaining buffering amount is more than required, the amount of the next buffering amount column 49 in the route control table 31b is lessened.

As described, the amount of the next buffering amount column 49 is lessened. When a transmission underrun occurs, the comparison controller 35b increases the amount of the next buffering amount column 49 by a certain predefined amount.

Embodiment 10

In embodiment 10, a simpler buffering method is offered in comparison to the method of controlling the buffer length adaptively. The simpler method is to switch two kinds of buffering methods, for example.

Figure 20:
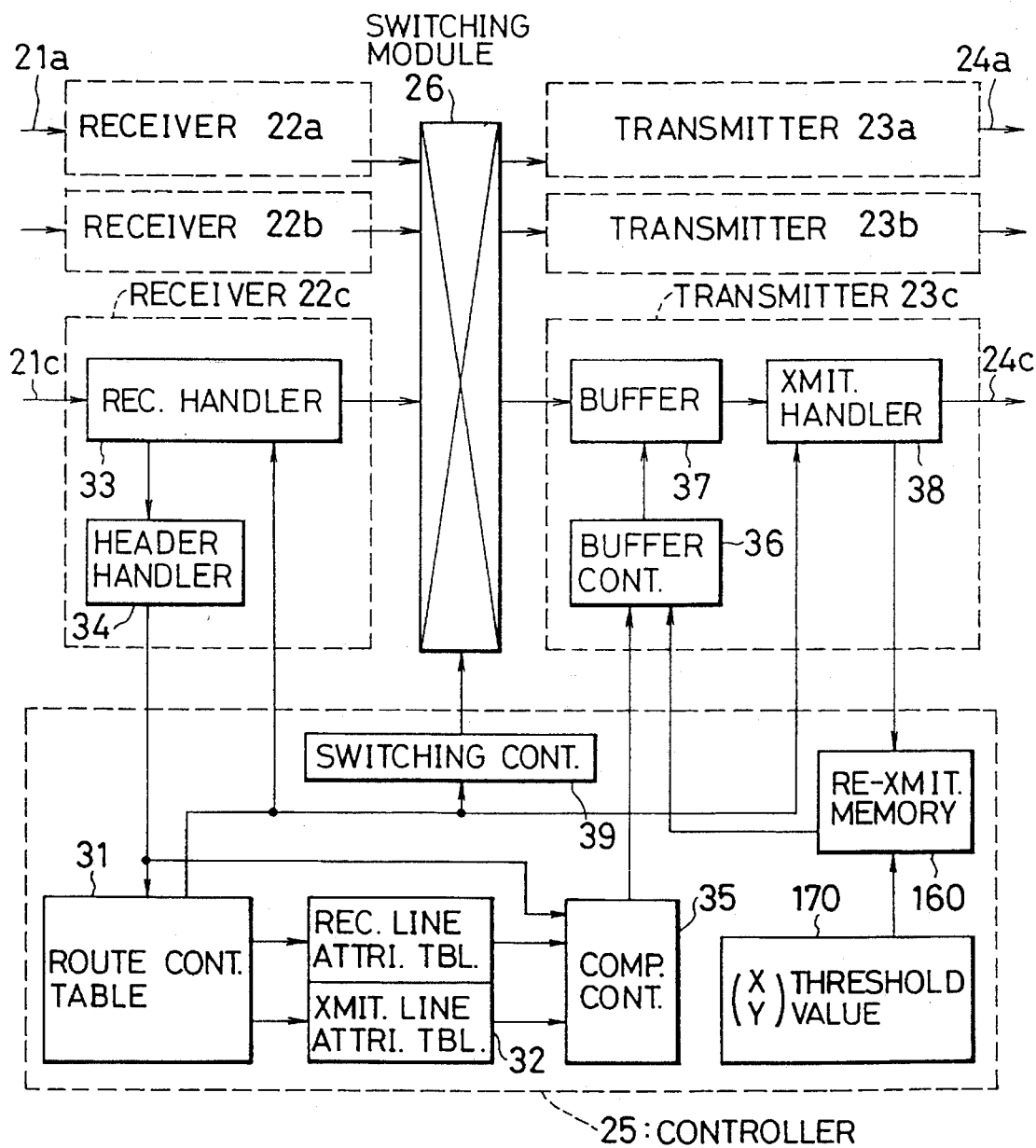
FIG. 20 shows a configuration chart of the frame relay apparatus of embodiment 10.

In embodiment 10, semi-storing and full-storing are taken as two kinds of buffering methods. A composition of the frame relay apparatus of embodiment 10 is shown in FIG. 20. Additionally, a re-transmission count memory 160 is provided to count the number of times of re-transmission per a predefined time, and a threshold value 170 of the re-transmission is provided. When the number of times of re-transmission exceeds the threshold value, the comparison controller 35 instructs the transmitter to store the whole received data before transmitting, regardless of the buffering amount from the comparison controller.

When the counted re-transmission times per the predefined time comes down to the threshold value during the full-storing operation, the previous semi-storing operation with the buffering amount calculated by the comparison controller resumes. In derail, two threshold values X and Y are provided to stabilize the switching of the full-storing operation and semi-storing operation.

Figure 21:
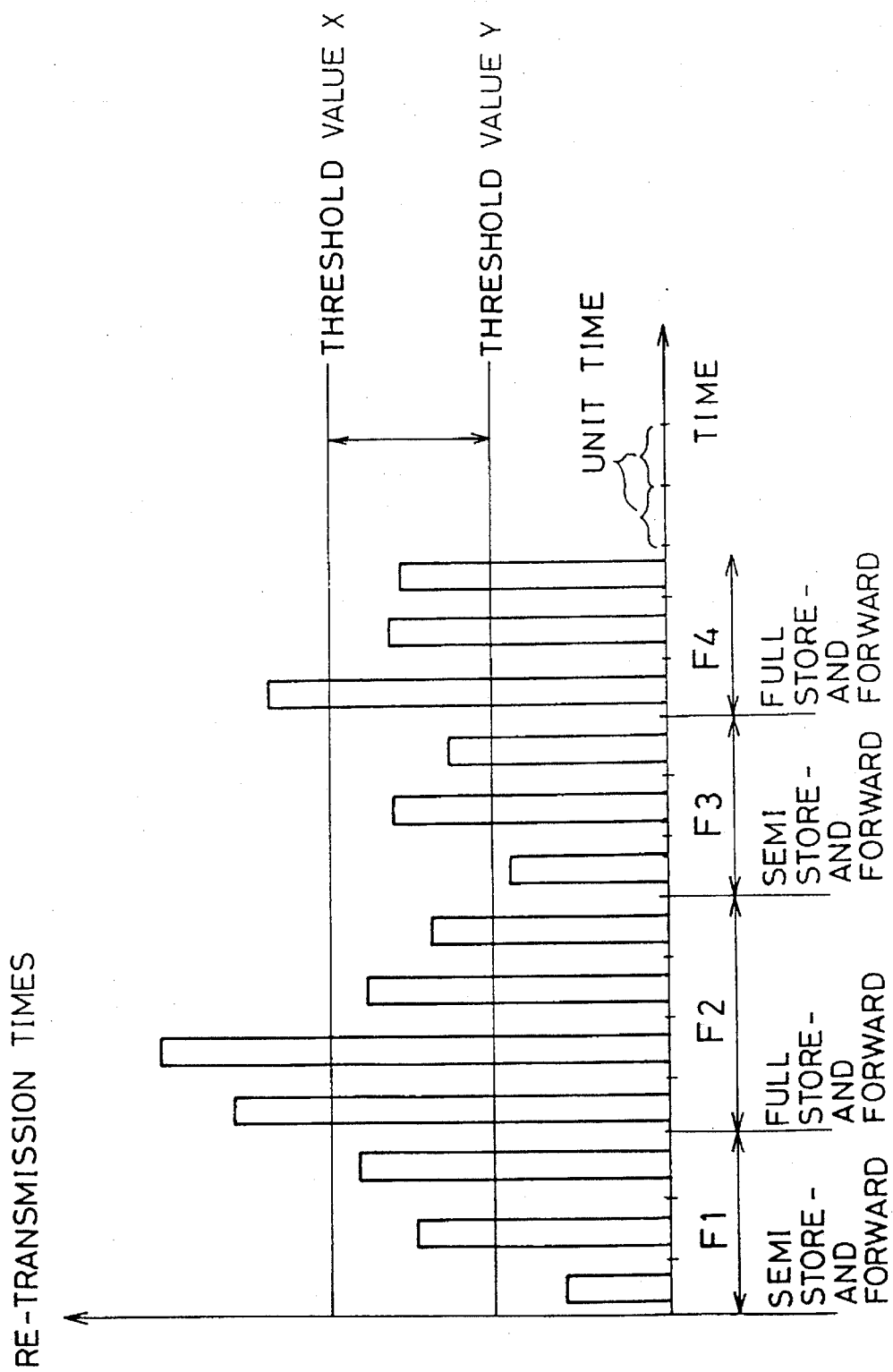
FIG. 21 shows a chart to explain a case where a switching of full store-and-forward and semi store-and-forward is made by using the threshold values X and Y.

FIG. 21 is a chart to show a case where a switching of full store-and-forward and semi store-and-forward is made smoothly by using the threshold values X and Y. As shown in FIG. 21, the semi store-and-forward is applied until the re-transmission times per a unit time exceeds the threshold value X. When the re-transmission times exceeds the threshold value X, the full store-and-forward is applied until the re-transmission number comes down below the threshold value Y.

In the frame relay apparatus of this embodiment, the re-transmission number per a certain unit time is stored. When the re-transmission number exceeds the threshold value of re-transmission, full-store operation starts. During the full-store operation, if the re-transmission number becomes equal to or less than the threshold value, a semi-store operation resumes.

Embodiment 11

In embodiment 8, the case in which the destination of the frame relay is outside of the frame relay network was explained. Similarly, in embodiment 11, a case in which a source of the frame is outside of the frame relay network and its destination is in the frame relay network will be explained. Basically, the case in embodiment 11 relays the frame only after correct information and a necessary information to improve a communication time efficiency are gotten when a communication frame is entering in the frame relay network.

In the frame relay apparatus of this embodiment, the apparatus is located at an entrance of receiving data from the outside of the frame relay network. The received data is stored fully once, or stored for a corresponding amount in case that the frame length is known, and transmitted to the network by including the information of the frame length.

Figure 23:
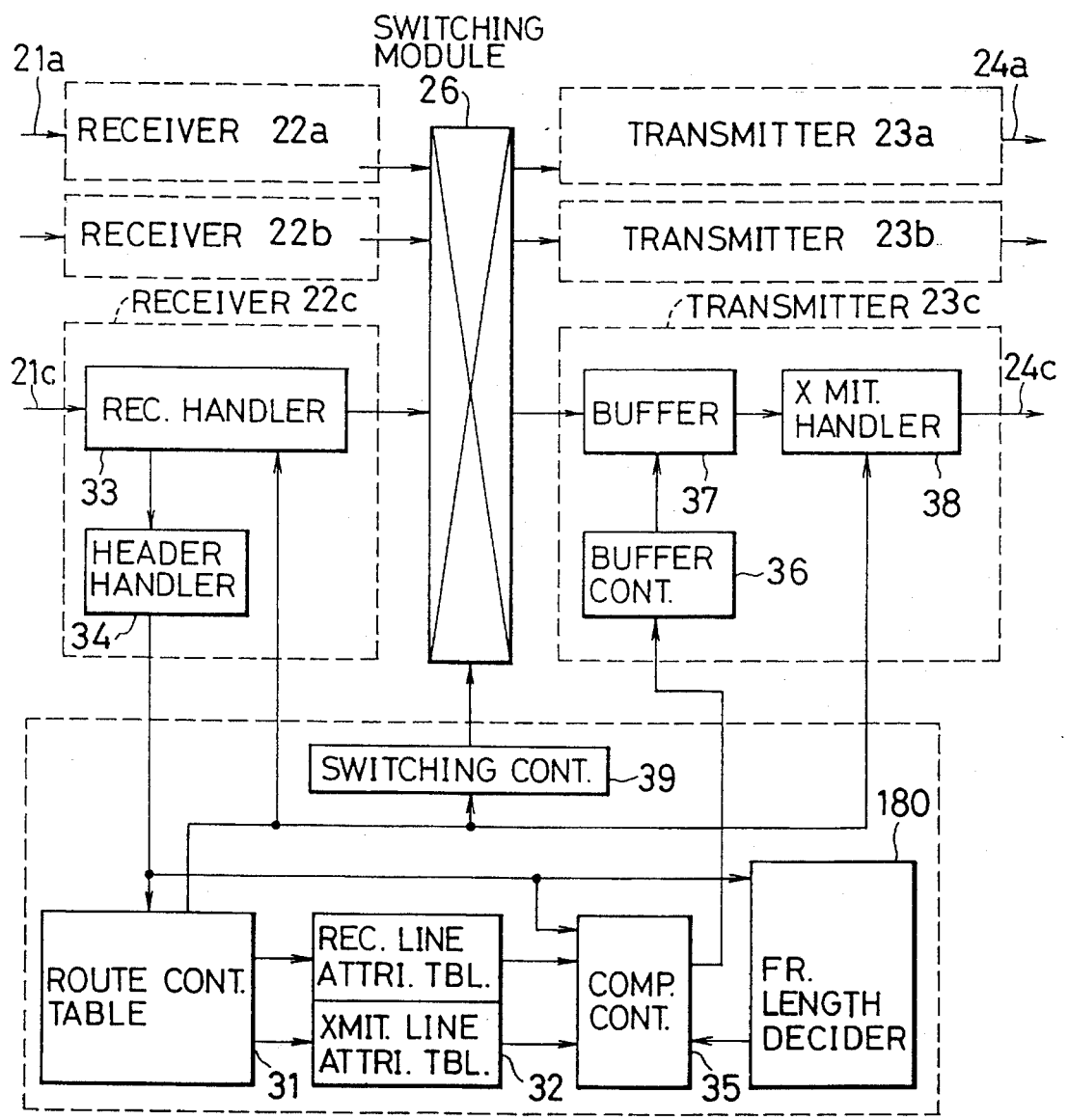
FIG. 23 shows a configuration chart of the frame relay apparatus of embodiment 11.

FIG. 22 shows a header format of the frame. A configuration of the frame relay apparatus of embodiment 11 is shown in FIG. 23.

As shown in FIG. 24, the route control table includes a column to indicate "outside" for the receiving line when the source of the receiving line (transmission source of the communication frame) is outside the frame relay network.

The comparison controller 35 instructs the transmitter to take the full-storing method, when the column indicates that the source of the receiving line is outside the range. Furthermore, the frame length decider 180 of the controller infers and decides a frame length by referring to a received logical link number (also called as a data link connection identifier ("DLCI") of the received frame). For example, the logical link numbers that are used in the frame relay network are classified as follows to decide the frame length:

| Actual Frame Length | DLCI | Representing Frame Length |
|---|---|---|
| $L < L_0$ | 0–1 | $L_0$ |
| $L_0 \leq L < L_1$ | 2–3 | $L_1$ |
| $L_1 \leq L \leq L_2$ | 4–5 | $L_2$ |

When the source creates a frame, or the frame relay apparatus stores a frame fully, the frame length may be known. A logical link number (DLCI) for a transfer of the frame is allocated to a classified range based on the frame length, and consequently the frame length may be decided from the logical link number (DLCI).

For example, when six logical link numbers, 0–5 are used as the DLCI, either 0 or 1 may be chosen to be used if the frame length L Is shorter than the length $L_0$. When the frame whose DLCI is set as either 0 or 1 is received, the storing amount may be calculated based on the frame length $L_0$ in case that the frame is transferred, as the frame length L is equal to or shorter than the length $L_0$.

When the frame length L is between $L_0$ and $L_1$, either 2 or 3 may be chosen as the DLCI to be used. Therefore, when the frame whose DLCI is set as either 2 or 3, the storing amount may be calculated based on the frame length $L_1$.

As described, the storing amount may be calculated by classifying the logical link numbers and allocating the frame lengths corresponding to the logical link numbers.

The operation in the configuration of embodiment 11 is as follows. When the frame relay apparatus receives a frame from a transmission source outside of the frame relay network, the frame relay apparatus recognizes the frame length from the logical link number (DLCI). Meanwhile, the transmitter takes the full-storing method at first by recognizing the indication of the outside in the route control table and transmits the frame by attaching to the header a classified logical link number recognized by the controller.

When the frame with the same logical link number is transmitted from the same transmission source, the buffering amount instructed by the comparison controller, i.e., the semi-storing method, may be taken to transmit.

The frame relay apparatus, located in the frame relay network, relays the frame in the semi-storing method based on the information of the frame length classified by the DLCI.

In this embodiment, the case in which the source is outside of the frame relay range and the case in which the classification is made by the DLCI are mixed in the explanation. However, the case in which the source is outside of the frame relay range and the case in which the classification is made by the DLCI may be applied separately. When the frame relay apparatus, whose source is outside of the frame relay range, classifies the DLCI, the frame from outside is fully stored. Hence, even if the frame relay apparatus receives the frame which does not employ the classification of the DLCI, the frame is transmitted into the network with the classification of the DLCI by recognizing the frame length and assigning the corresponding DLCI to the frame in the frame relay apparatus.

Embodiment 12

In embodiment 12, this invention is applied to a relay apparatus to transmit the communicating information which is received in a form of an ATM (Asynchronous Transfer Mode) cell, etc. after transforming it back to a form of a frame. This invention is applied in an interworking unit (IWU) or a gate way to connect ATM based networks. The relay apparatus is used for interconnection over ATM based networks. For this application, a required buffering amount may be calculated based on the cell size and the receiving interval at an entry point.

Figure 25:
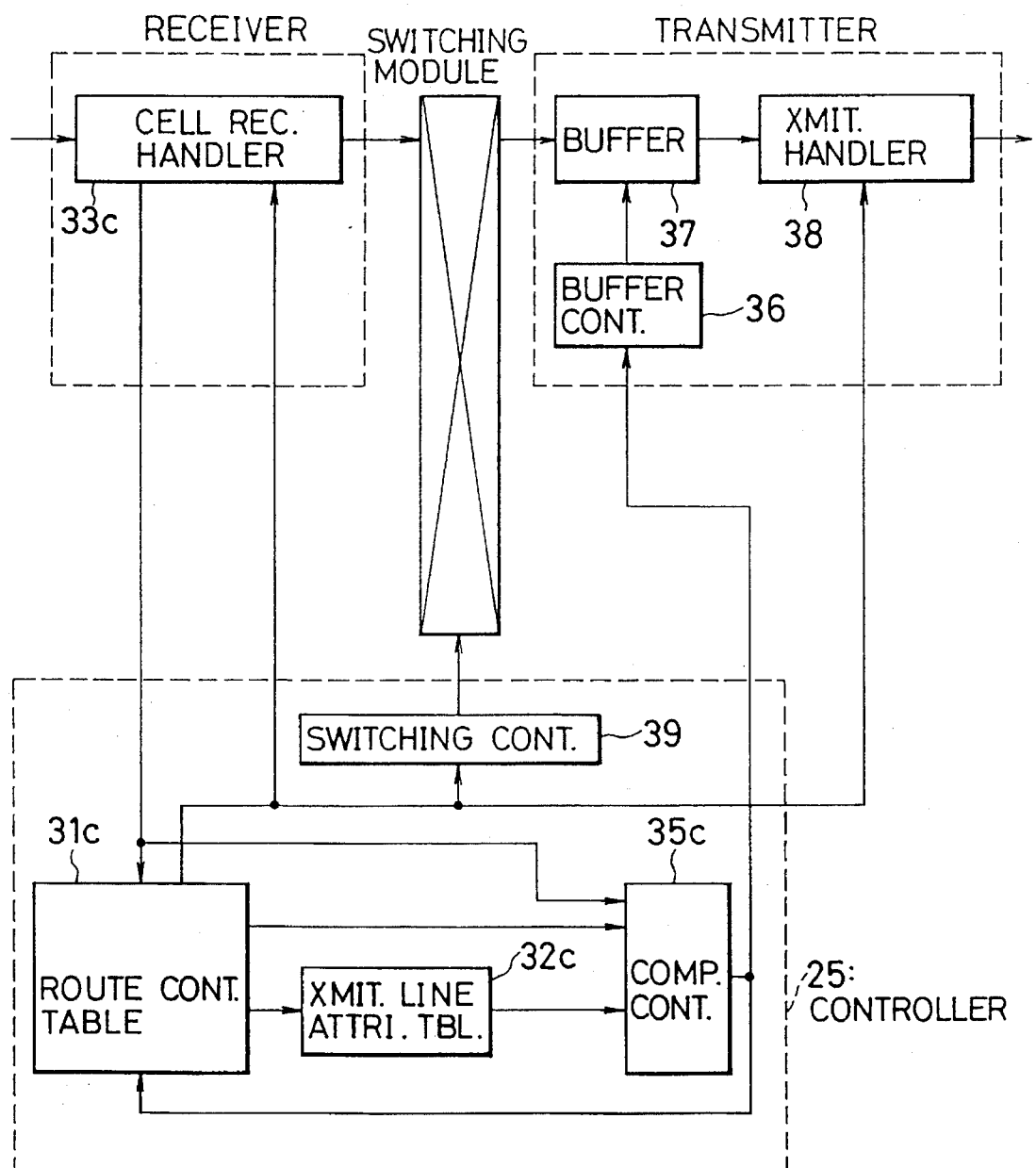
FIG. 25 shows a configuration of the frame relay apparatus of embodiment 12.

FIG. 25 shows a configuration chart of the frame relay apparatus of embodiment 12. In FIG. 25, a cell receiving handler 33c receives cells which are transmitted from a network outside of the frame relay network and analyzes the receiving intervals and the DLCI included in the header cell. The route control table 31c classifies the frame lengths by the logical link number (DLCI) as in embodiment 11. A transmitting line attribute table 32c indicates at least a transmitting rate of the output signal. The comparison controller 35c calculates the buffering amount from an average receiving cell interval, the DLCI of the header cell and a transmission rate indicated in the line attribute table.

This operation is as follows. The cell receiving handler 33c receives a cell from the outside of the network and informs the controller of the cell length and cell interval from the header cell. This information is stored in the route control table, and the transmission rate is known by referring to the destination of the transmitting line. According to this information, the storing amount of the buffer is instructed to the transmitter and the transmitter constructs a frame to be output to the transmitting line after the instructed buffering.

Embodiment 13

In embodiment 13, this invention is applied to the frame relay apparatus which transmits the communicating information in a form of an ATM cell which uses ATM adaptation layer 3/4 (AAL 3/4) after transforming it back to a form of a frame. As in embodiment 12, the cell size and the transmitting rate of the input signal are recognized at the entry point and informed to the controller.

The configuration of the frame relay apparatus of embodiment 13 is same as embodiment 12 shown in FIG. 25. In embodiment 13, the transmitting rate of input signal is also indicated in the line attribute table.

Figure 26:
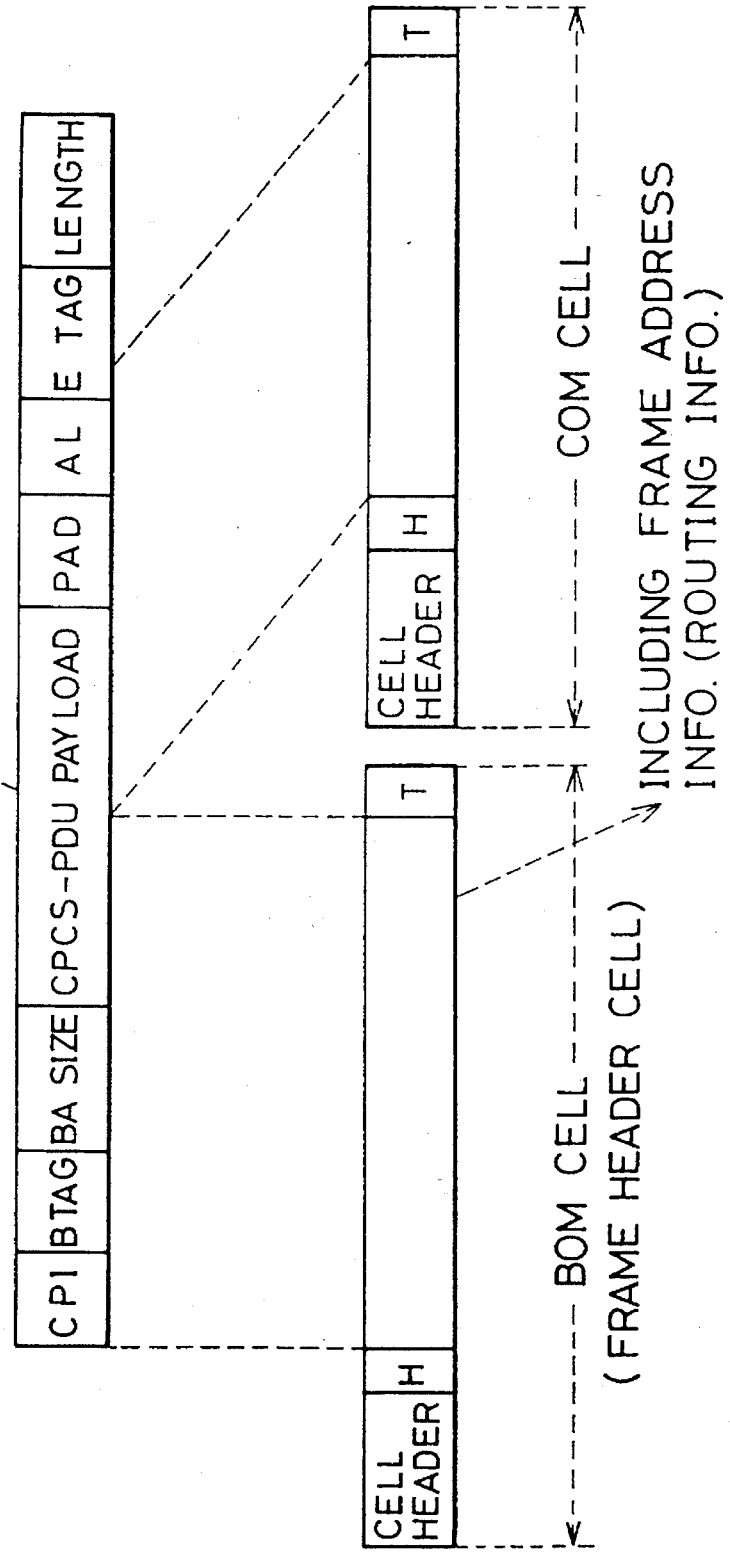
FIG. 26 shows the details of a BOM cell.

FIG. 26 shows details of receiving header cell (BOM cell).

This operation is as follows. Information from the outside of the frame relay network reaches the frame relay apparatus being split in BOM cell, COM cell (connector) and EOM cell (ending). The cell receiving handler 33c analyzes the information volume from a BA size in the received BOM cell and recognizes the transmitting line from the address information. The comparison controller 35c calculates the storing amount of the sending buffer 37 based on the BA size and the transmitting rates of the input signal and the output signal. The transmitter starts a transmission after the calculated buffering.

Embodiment 14

In embodiment 14, the relay apparatus of this invention is applied to a case in which input cells reach randomly without intervals and a group of cells with multiple destinations is transferred to a same relay line.

Figure 27:
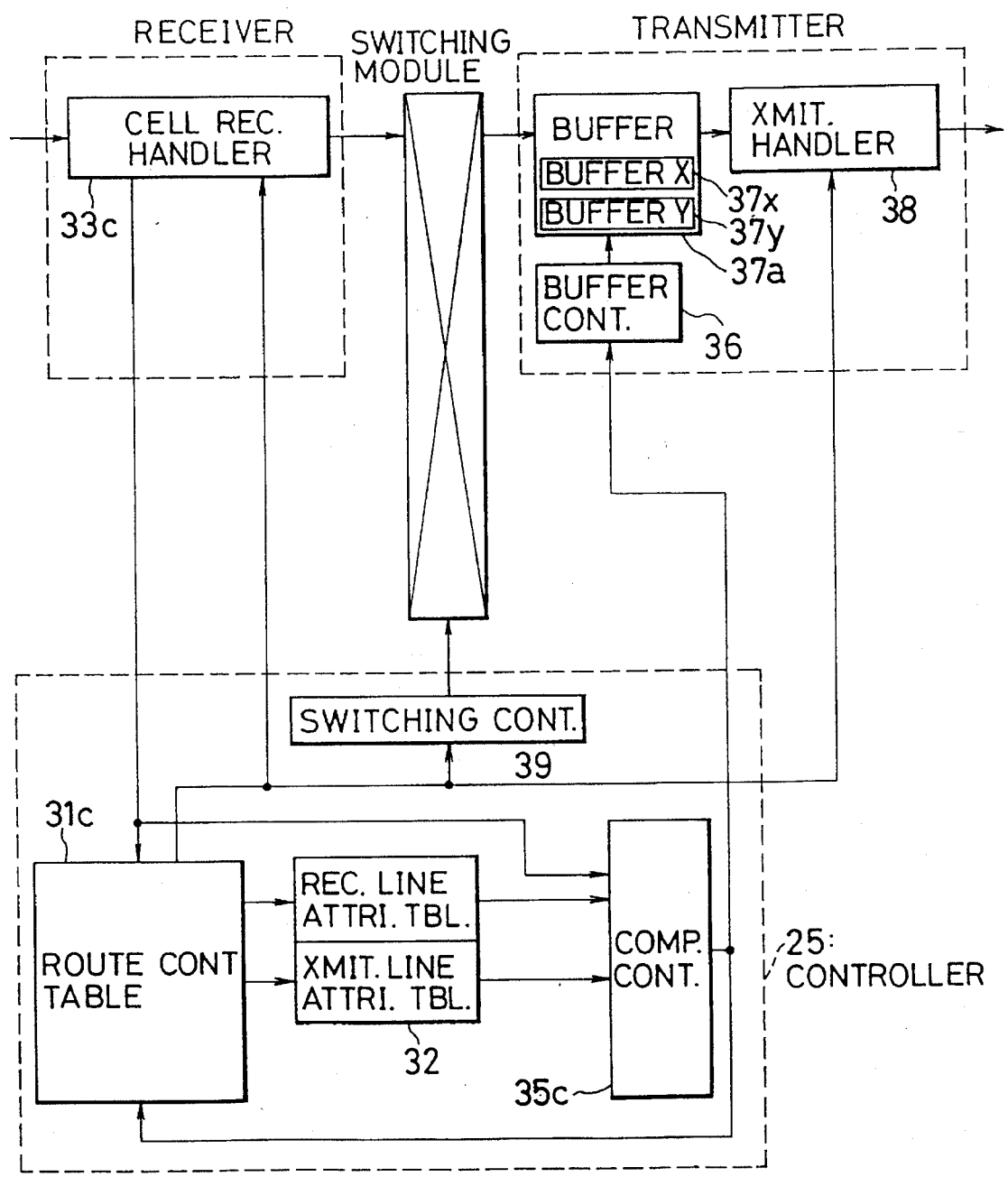
FIG. 27 shows a configuration of the frame relay apparatus of embodiment 14.

The configuration of the frame relay apparatus of this embodiment is shown in FIG. 27. In embodiment 14, the line attribute table also includes the information on the rates of the receiving lines. Furthermore, the multiple sending buffers are provided for a transmitting line.

This operation is as follows. The receiving cells construct a frame in a certain connection. Therefore, the receiving cells are stored orderly in the buffer X for frame A. In this explanation, it is assumed that the transmission is not made, as the condition is not ready for the transmission of the frame A.

At the same time, a group of the input cells constitutes frame B in the buffer Y based on another connection and it becomes ready to transmit to the same transmitting line as the one for frame A. Since the frame relay apparatus of embodiment 14 includes multiple buffers for the identical transmitting line, the frame B of the connection which becomes ready for transmission at first is transmitted, regardless of the previously transmitted connection and the arrival order of the header cell.

In the frame relay apparatus of this embodiment, the received data is stored in multiple sending buffers independently and orderly. Among the data, the data of the sending buffer Is transmitted from the frame which is stored for the predefined amount.

Embodiment 15

In embodiment 15, embodiment 8 is combined with embodiment 11, for example. In embodiment 15, the frame relay apparatus which constitutes the frame relay network takes the semi store-and-forward switching method in order to shorten the transfer time. Meanwhile, the frame relay apparatus located at a border of the frame relay network takes the full store-and-forward switching method.

The system configuration chart is shown in FIG. 15 (b), for example. In FIG. 15 (b), the frame relay apparatus 2a and 2c takes full store-and-forward switching method, while the frame relay apparatus 2b takes semi store-and-forward switching method.

FIG. 28 shows the route control table of this embodiment. In the route control table, there is a column to write "outside" for the receiving line and the transmitting line.

The information sent from a transmission source is fully stored to confirm the data length, etc. at a relay apparatus in which the information is constructed to be a frame at first. After this, the information in a form of a frame is relayed in semi store-and-forward method in order to Improve the communication time efficiency. In the last frame relay apparatus, the information is fully stored to lighten the burden of the apparatuses in another network and normal data is transmitted.

In the group of frame relay apparatuses of this embodiment, an operation of full-storing, i.e., buffering all the data and transmitting, is taken for receiving the data from the outside of the frame relay network and sending the data to the outside of the frame relay network, in principal. Then, an operation of semi-storing, i.e., buffering for a predefined amount and transmitting, is taken for transmitting and receiving the data within the network.

Embodiment 16

This invention may also be applied to a frame relay apparatus which is not made of the separate special mechanisms of the receiver, transmitter and controller.

Figure 29:
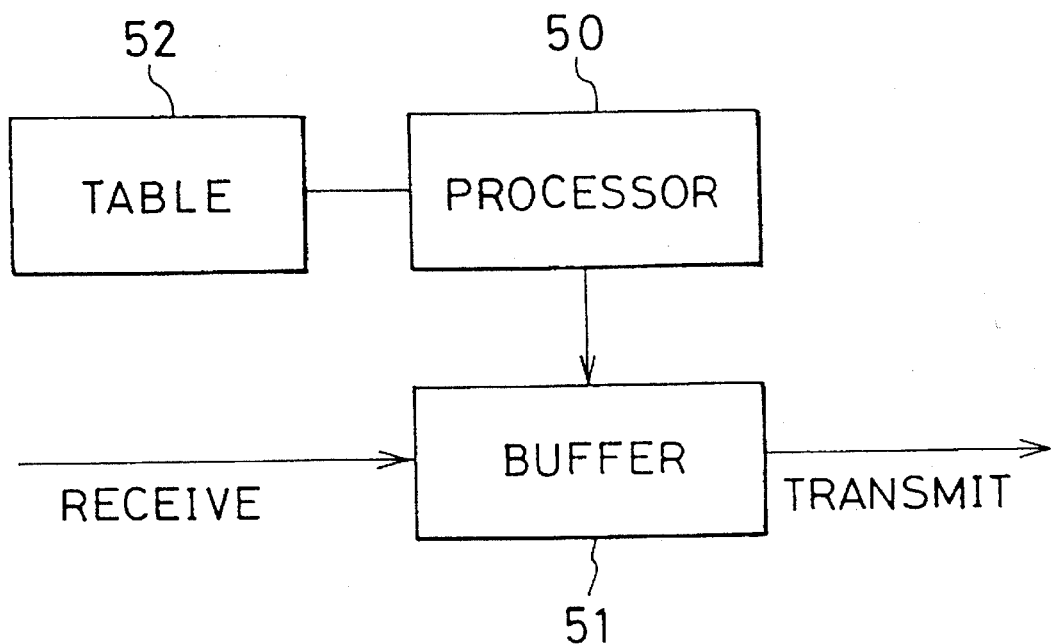
FIG. 29 shows a configuration of the relay apparatus which realizes the relay method of embodiment 16.
Figure 30:
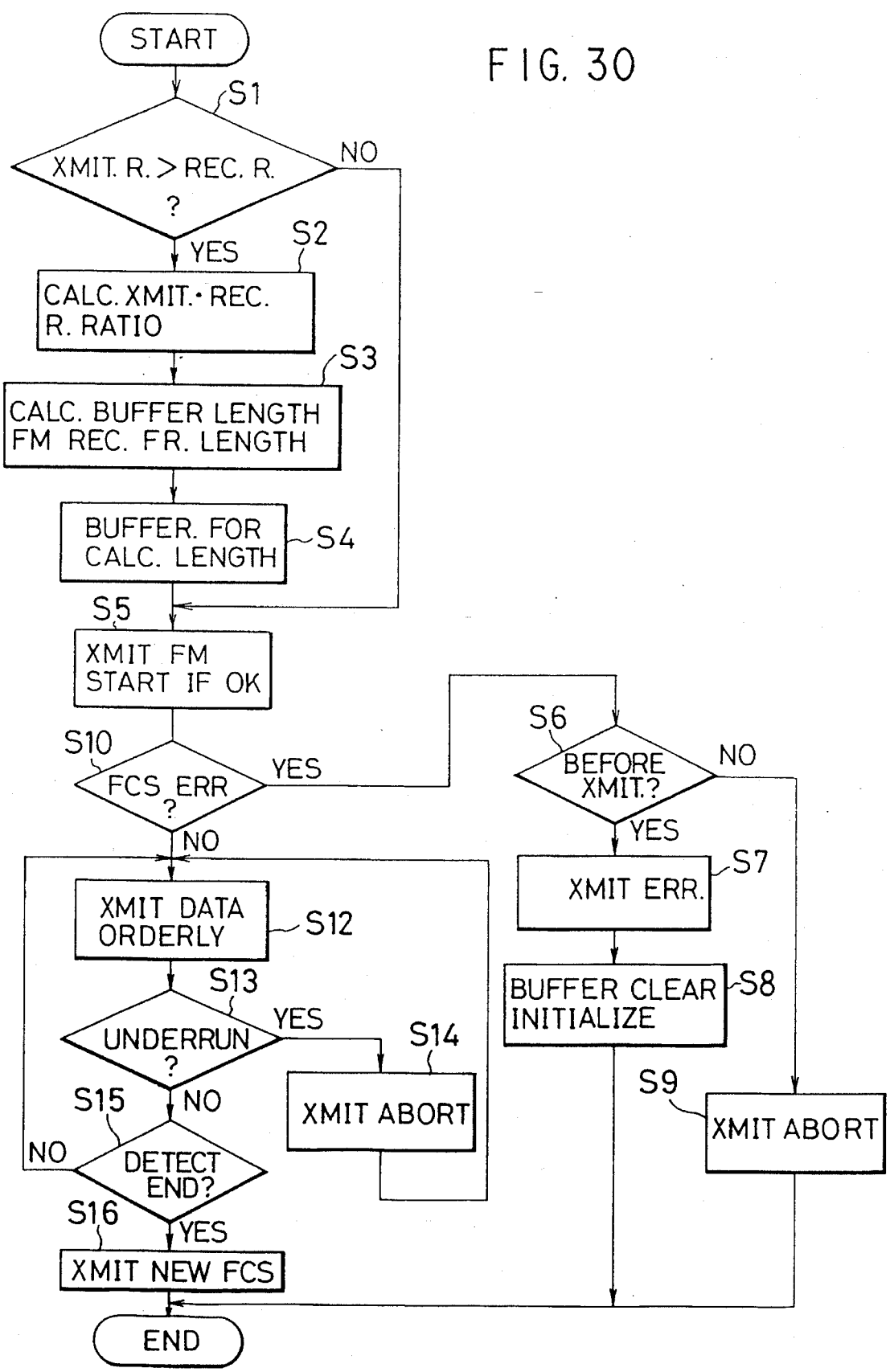
FIG. 30 shows a sequence chart to explain the operation of the relay method of embodiment 16 and 17.

FIG. 29 shows a relay apparatus which includes a general-purpose micro processor 50, two port memory buffer 51, and control reference table 52. Concerning the two port memory buffer, the same number or more number of memories than the number of the communication lines are provided, if necessary. The processor 50 controls the frame relay in accordance with a flow chart shown in FIG. 30 for each communication line.

This operation is as follows.

Step S1

When the processor receives an input from a transmission source, the processor recognizes a received logical link number from the header information and recognizes the transmitting logical link number and the transmitting rates of the input signal and output signal in reference with the control reference table. When the transmitting rate of the output signal is equal to or lower than the transmitting rate of the input signal, the information is transmitted at once.

Step S2

If the transmitting rate of the output signal is higher than the transmitting rate of the input signal, a ratio of the transmitting rate and the receiving rate is calculated at the same time, when the received data is begun to be stored in the two port memory buffer.

Step S3

A necessary buffering amount is calculated by recognizing or assuming the received frame length and also by using the ratio of the transmission rates.

Step S4

The received data is buffered up to the calculated buffering amount.

Step S5

If the received data is buffered up to the calculated buffering amount, a transmission starts. If the received data is not buffered upto the calculated buffering amount, the transmission does not start at this point.

Step S10

The receiving FCS is checked.

Step S6

If a FCS error is found before starting of a transmission, the buffer is cleared (Step S8). In case that a FCS error is found after starting of a transmission, an abort signal is transmitted (Step S9).

Step S12

If the check result of the receiving FCS is normal, the transmission of the data which is stored in a predefined amount is started from the header, if it is not started at Step S5. Or, the transmission of the data is continued, if it has been started at Step S5. The data is transmitted orderly until the end of the data is detected.

Step S13

When a transmission underrun occurs during the transmission time, an abort signal is sent In Step S14.

When the abort signal is sent, data transmission resumes from the header of the buffer in Step S12.

Step S16

A new FCS is generated and transmitted.

Embodiment 17

In embodiment 16, the frame relay method of the relay apparatus in the frame relay network is explained. In embodiment 17, the frame relay method of this invention is applied to a relay apparatus located on the border of the frame relay network.

Figure 31:
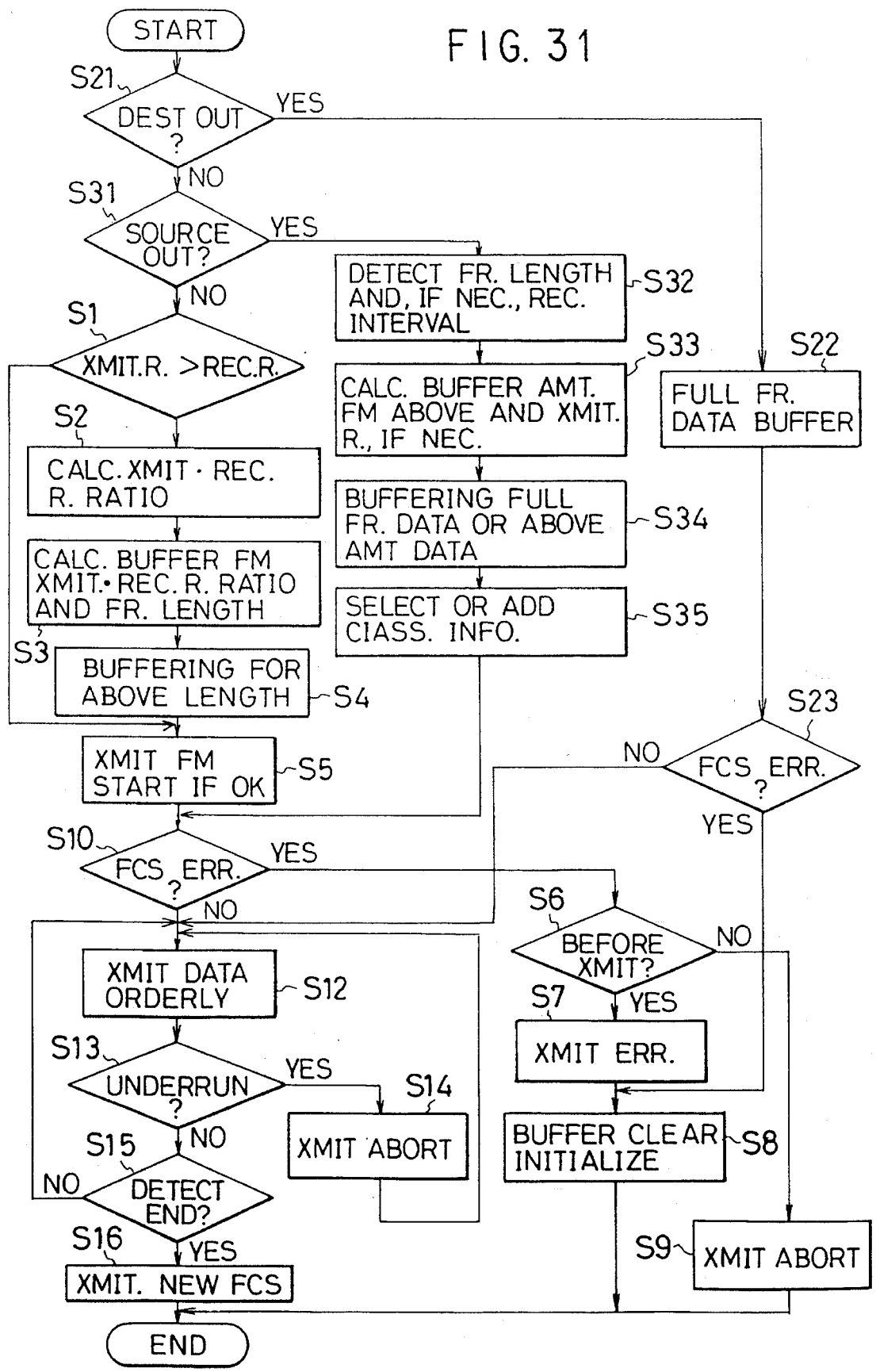
FIG. 31 shows a sequence chart to explain the operation of the relay method of embodiment 18.

A configuration of embodiment 17 is the same as FIG. 29. The operation flow chart is shown in FIG. 31.

At first, a case in which a destination is an apparatus located outside of the frame relay network is explained.

Step S21

When data is received, it is checked to determine if the destination is outside of the frame relay network in reference with the transmitting logical link number of the frame.

Step S22

When the destination is found to be an apparatus located outside of the network in step S21, the receiving data is fully buffered once.

Step S23

When an error is detected by checking the received FCS, the buffer is cleared (Step S8) and the re-receipt of the data is waited. If the received FCS is normal, the transmission ends in the method of embodiment 16 (Steps S12, S13, S15, S16).

A case in which the receiving source is an apparatus located outside of the frame relay network is explained.

Step S31

It is checked to determine if the receiving source (transmission source) is an apparatus outside of the frame relay network. In case that it is an apparatus in the network, the transmission starts as described in embodiment 16 (Steps S1, S3, S4, S5 . . . ).

Step S32

If it is an apparatus outside of the network, a frame length is detected or assumed. In case that the input is a cell, a receiving interval is detected.

Step S33

By using the information gotten in the step S32 together with the transmitting rate of the output signal and the transmitting rate of the input signal, a required buffering amount is calculated. Furthermore, the transmitting logical link numbers are allocated to the groups which are classified according to the frame lengths.

Step S34

Receiving data is stored for a predefined buffering amount once, or buffered for the required buffering amount calculated in the Step S33.

Step S35

The transmitting logical link number acquired in the step 33 is added to the transmission data.

Step S36

When an error is detected by checking the receiving FCS, the buffer is cleared (step S8) and a re-receipt is waited. If it is normal, a transmission starts or continues as described in embodiment 16 (Step S12). If the receiving source is an apparatus located outside of the frame relay network, the transmission starts at this point, because full store-and-forward method is applied.

As described, this apparatus minimizes a transmission delay without a transmission underrun and improves a communication time efficiency by providing the route control table, line attribute table, comparison controller to calculate the buffering amount based on the data in the tables, and buffer and transmitter to start transmission after a required stored time.

When a receiving FCS error is detected before the start of a transmission, the transmission is suspended to improve the line efficiency.

The route control table, line attribute table, comparison controller to check transmission rates, and buffer and transmitter to start a transmission only after a predefined store time ensure that a transmission resumes immediately even in case that a transmission underrun occurs. Consequently, a communication time efficiency is improved.

Furthermore, when the destination of the transmitting line is outside the range of the frame relay, the full store-and-forward switching is taken. Consequently, the transmission time is shortened and the re-transmission process burden of the apparatus located outside of the range of the frame relay is lessened.

Furthermore, a required buffering amount is adjusted by analyzing the remaining buffering amount and an occurrence frequency of the transmission underrun at the previous transmission time. Consequently, a communication time efficiency is improved, even when the invention is applied to a frame whose frame length is unknown.

Furthermore, the full store-and-forward and semi store-and-forward methods are able to be switched according to the number of re-transmission times per a certain predefined time. Consequently, a credibility and a time shortening are balanced in a small size apparatus configuration.

Furthermore, when the source of the receiving line is outside range of the frame relay range, the full store-and-forward method is taken. Consequently, a confusion due to an abnormal data is avoided in case that the data is received in the range of the frame relay and the time of the later data relay is shortened.

Furthermore, when the source of the receiving line is outside of the frame relay range, a corresponding logical link number is selected in order to construct the cells, etc. in a frame. Consequently, a relay within the frame relay is made properly.

Furthermore, multiple frame construction buffers are provided to receive cells, etc. in order to transmit from a frame which meets the transmission condition. Consequently, a usage rate of the transmitting line may be increased and a communication time efficiency is improved.

Furthermore, the relay apparatus within the frame relay range takes the semi store-and-forward method and the relay apparatus on the border takes the full store-and-forward method. Consequently, a credibility and a time shortening are balanced.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A frame relay apparatus connected to input lines and output lines, comprising:

at least one receiver, receiving a frame on one of the input lines at a first transmission rate, the frame having a header, the receiver including means for providing header information indicative of the header;

a controller, receiving the header information, including;
      means for selecting one of the output lines as a selected output line on which to transmit the frame;
      means for determining a second transmission rate of the output line; and
      means for determining a buffering amount based on the first and the second transmission rates and on the header information; and at least one transmitter, including;
      a buffer coupled to the at least one receiver to receive the frame;
      means for storing a portion of the frame in the buffer according to the buffering amount; and
      means for transmitting the contents of the buffer on the selected output line at the second transmission rate.

2. The frame relay apparatus of claim 1 further comprising a switching module coupling the at least one receiver to the at least one transmitter, the switching module being controlled by the controller.

3. The frame relay apparatus of claim 1 wherein the means for determining a buffering amount determines no buffering if the second transmission rate is less than the first transmission rate.

4. The frame relay apparatus of claim 1 wherein the header information includes a frame length, indicative of the length of the frame, and the means for determining a buffering amount utilizes the frame length to determine the buffering amount.

5. The frame relay apparatus of claim 1 wherein the controller includes an attribute table having stored therein the second transmission rate and wherein the means for determining a second transmission rate accesses the attribute table to determine the second transmission rate.

6. The frame relay apparatus of claim 5 wherein the frame relay apparatus further includes a control table and wherein the frame received by the receiver includes a transmitting logical line number and the control table includes a maximum frame length corresponding to the transmitting logical line number and wherein the means for determining a buffer amount determines the buffering amount based on the first and second transmission rates and on the maximum frame length.

7. The frame relay apparatus of claim 1 wherein the frame includes a frame check sequence and wherein the frame relay apparatus further comprises:

means in the at least one receiver, coupled to the input lines, for checking the frame check sequence of the frame received by the receiver and for producing an error signal if there is a frame check error; and means, coupled to the means for checking and the means for transmitting, for providing the error signal on the selected output line.

8. The frame relay apparatus of claim 7 further including a receiving buffer in the at least one receiver, coupled to the input lines, to hold a frame, the receiving buffer discarding the frame in response to the frame check error detected by the means for checking.

9. The frame relay apparatus of claim 1 further comprising:

an underrun detector to detect if an underrun has occurred in the at least one transmitter; and a re-transmission requester to cause the at least one transmitter to retransmit the frame stored in the buffer in response to the underrun detector detecting an underrun.

10. The frame relay apparatus of claim 1 wherein the frame relay apparatus further includes a control table, and wherein the control table includes first range information indicating whether the frame is destined to be transmitted outside of a predetermined range of external frame relay apparatuses and wherein the controller includes means for accessing the control table to access said first range information and wherein the means for storing will store the entire frame if the frame is destined to be transmitted outside the predetermined range.

11. The frame relay apparatus of claim 6 wherein the control table includes a buffering amount stored therein and the means for determining a buffering amount accesses the control table to determine the buffering amount, and wherein the transmitter includes means for checking the buffer to determine if a portion has been unutilized, the transmitter including means for reducing the buffering amount stored in the control table in response thereto, the transmitter further including means for detecting an underrun and for increasing the buffering amount stored in the control table in response thereto.

12. The frame relay apparatus of claim 1, wherein the means for transmitting includes means for retransmitting the contents of the buffer if an error occurs, the frame relay apparatus further comprising:

a re-transmission count memory to count times of re-transmission in a predefined time;

means for determining whether the re-transmission count memory has a count exceeding a first predetermined threshold value and whether the re-transmission count memory has a count below a second predetermined threshold value; and wherein the means for storing stores the entire frame, if the means for determining determines that the count exceeds the first predetermined threshold and wherein the means for storing stores a portion of the frame according to the buffering amount, if the count is less than the second predetermined threshold value.

13. The frame relay apparatus of claim 6 wherein the control table includes information indicating the frame originated from outside a predetermined range of external frame relay apparatuses, and wherein the means for determining a buffering amount determines the entire frame should be stored, if the information indicates the frame originated from outside the predetermined range.

14. A method for relaying a frame on a frame relay apparatus, the frame being received at a first rate, and transmitted on a transmission line at a second rate, the method comprising the steps of:

(a) receiving the frame from a transmission source, the frame having a header;

(b) determining the first rate and the second rate by referring to a reference table using information from the header;

(c) if the second rate is not greater than the first rate, transmitting the frame immediately;

(d) if the second rate is greater than the first rate, calculating a ratio of the first rate with respect to the second rate to determine a buffering amount in conjunction with a frame length of the frame;

(e) buffering the received frame in accordance with the buffering amount if step (d) determines the second rate is greater; and (f) transmitting the buffered frame, if step (d) determines the second rate is greater.

15. The method of claim 14, further comprising the steps of checking a frame check sequence of the received frame to determine if a frame check sequence error is present; and transmitting the frame check sequence error on the transmission line if a frame check sequence error is detected.

16. The method of claim 15 wherein steps (c) and (f) occur after the step of checking.

17. The method of claim 16 further comprising the steps of detecting if a transmission underrun has occurred on the transmission lines, and transmitting an abort signal on the transmission line, if an underrun is detected.

18. A method of relaying a frame on a frame relay apparatus in a frame relay network, the method comprising the steps of:

(a) receiving a frame at a reception rate;

(b) determining if a destination of the frame is outside the frame relay network;

(c) if step (b) determines that the frame is destined to outside of the frame relay network, buffering the entire frame and checking the frame for a frame check sequence error;

(d) checking if the received frame is from a source outside the frame relay network;

(e) if step (d) determines that the source is outside the frame relay network determining a frame length of the frame;

(f) calculating a buffering amount based upon the reception rate, a transmission rate, and the frame length;

(g) buffering an amount of the received frame in accordance with the buffering amount; and (h) transmitting the buffered frame data at the transmission rate.

19. A method of relaying a frame on a frame relay apparatus in a frame relay network, the method comprising the steps of:

(a) receiving a frame at a reception rate;

(b) determining if a destination of the frame is outside the frame relay network;

(c) if step (b) determines that the frame is destined to outside of the frame relay network, buffering the entire frame and checking the frame for a frame check sequence error;

(d) calculating a buffering amount based upon the reception rate, a transmission rate, and the frame length;

(e) buffering an amount of the received frame in accordance with the buffering amount; and (f) transmitting the buffered frame data at the transmission rate.

20. A method of relaying a frame on a frame relay apparatus in a frame relay network, the method comprising the steps of:

(a) receiving a frame at a reception rate;

(b) checking if the received frame is from a source outside the frame relay network;

(c) if step (b) determines that the source is outside the frame relay network determining a frame length of the frame;

(d) calculating a buffering amount based upon the reception rate, a transmission rate, and the frame length;

(e) buffering a portion of the received frame prior to commencing transmission, the portion buffered being in accordance with the buffering amount; and (f) transmitting the frame data at the transmission rate.

21. A method of relaying a frame on a frame relay apparatus in a frame relay network, the method comprising the steps of:

(a) receiving a frame at a reception rate;

(b) calculating a buffering amount based upon the reception rate, a transmission rate, and the frame length;

(c) buffering a portion of the received frame prior to commencing transmission, the portion buffered being in accordance with the buffering amount; and (d) transmitting the frame data at the transmission rate.

* * * * *